(12) United States Patent
Hajati et al.

(10) Patent No.: US 11,056,032 B2
(45) Date of Patent: Jul. 6, 2021

(54) SCANNING DISPLAY SYSTEMS WITH PHOTONIC INTEGRATED CIRCUITS

(71) Applicant: Apple Inc., Cupertino, CA (US)

(72) Inventors: Arman Hajati, San Mateo, CA (US); Robert S. Upton, Mountain View, CA (US); Yuval Gerson, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 18 days.

(21) Appl. No.: 16/554,334

(22) Filed: Aug. 28, 2019

(65) Prior Publication Data
US 2020/0090569 A1 Mar. 19, 2020

Related U.S. Application Data

(60) Provisional application No. 62/731,448, filed on Sep. 14, 2018.

(51) Int. Cl.
*G09G 5/02* (2006.01)
*G09G 3/02* (2006.01)
(Continued)

(52) U.S. Cl.
CPC .............. *G09G 3/02* (2013.01); *G02B 6/4204* (2013.01); *G02B 17/06* (2013.01); *G02B 26/0816* (2013.01); *G02B 26/101* (2013.01); *G02B 26/105* (2013.01); *G02B 27/30* (2013.01); *G06F 3/011* (2013.01); *G06F 3/012* (2013.01); *G06F 3/013* (2013.01); *G09G 3/346* (2013.01);
(Continued)

(58) Field of Classification Search
CPC .. G09G 3/02; G09G 3/346; G09G 2340/0407; G02B 6/4204; G02B 6/423; G02B 26/0816; G02B 26/101; G02B 26/105; G02B 26/10; G02B 26/124; G02B 26/125; G02B 27/30; G02B 27/0093; G02B 27/0172; G02B 2027/0112; G02B 2027/0138; G06F 3/011; G06F 3/012; G06F 3/013
See application file for complete search history.

(56) References Cited

U.S. PATENT DOCUMENTS 5,325,386 A 6/1994 Jewell et al.
7,446,822 B2 11/2008 Stern et al.
(Continued)

FOREIGN PATENT DOCUMENTS

CN 102597869 A 7/2012
GB 2515517 A 12/2014
(Continued)

*Primary Examiner* — Adam J Snyder
(74) *Attorney, Agent, or Firm* — Treyz Law Group, P.C.; Michael H. Lyons

(57) ABSTRACT

A display system may display image frames. The system may include multiple sets of laser dies. Each set of laser dies may emit a respective set of beams of light to a photonic integrated circuit. Each set of beams may include light in at least three wavelength ranges that include visible and/or infrared wavelengths. Channels in the photonic integrated circuit may receive the sets of beams with a first pitch and may emit the set of beams with a second pitch that is finer than the first pitch and at a given angular separation to tangential and sagittal axis scanning mirrors.

24 Claims, 15 Drawing Sheets

(51) Int. Cl.

| | | |
|---|---|---|
| *G02B 6/42* | (2006.01) | |
| *G02B 26/08* | (2006.01) | |
| *G02B 26/10* | (2006.01) | |
| *G02B 27/30* | (2006.01) | |
| *G06F 3/01* | (2006.01) | |
| *G02B 17/06* | (2006.01) | |
| *G09G 3/34* | (2006.01) | |
| *G02B 27/01* | (2006.01) | |
| *G02B 27/00* | (2006.01) | |
| *G02B 26/12* | (2006.01) | |

(52) U.S. Cl.
CPC .............. *G02B 6/423* (2013.01); *G02B 26/10* (2013.01); *G02B 26/124* (2013.01); *G02B 26/125* (2013.01); *G02B 27/0093* (2013.01); *G02B 27/0172* (2013.01); *G02B 2027/0112* (2013.01); *G02B 2027/0138* (2013.01); *G09G 2320/064* (2013.01); *G09G 2340/0407* (2013.01)

(56) References Cited

U.S. PATENT DOCUMENTS

| | | |
|---|---|---|
| 7,450,286 B2 | 11/2008 | Konno et al. |
| 8,371,698 B2 | 2/2013 | Brown et al. |
| 8,373,690 B2 | 2/2013 | Kurozuka et al. |
| 8,395,633 B2 | 3/2013 | Kurozuka et al. |
| 9,946,089 B2 | 4/2018 | Chen et al. |
| 9,986,215 B1 | 5/2018 | Tardif et al. |
| 10,205,055 B2 | 2/2019 | Chu et al. |
| 10,209,509 B1 | 2/2019 | Inada et al. |
| 10,417,975 B2 | 9/2019 | Tardif et al. |
| 2003/0095737 A1 | 5/2003 | Welch et al. |
| 2006/0062519 A1 | 3/2006 | Kish et al. |
| 2012/0169752 A1* | 7/2012 | Kurozuka .......... G02B 27/0101 345/545 |
| 2013/0208003 A1 | 8/2013 | Bohn et al. |
| 2017/0236463 A1 | 8/2017 | Chi et al. |
| 2018/0120559 A1* | 5/2018 | Yeoh .................... G02B 5/3083 |
| 2018/0122143 A1 | 5/2018 | Ellwood et al. |
| 2018/0295331 A1* | 10/2018 | Tardif .................. H04N 9/3135 |
| 2019/0121136 A1 | 4/2019 | Pierer et al. |
| 2019/0155021 A1* | 5/2019 | Wall ...................... G02B 30/00 |
| 2019/0179150 A1* | 6/2019 | Pierer ................... G03B 33/12 |
| 2019/0196200 A1 | 6/2019 | Pierer et al. |
| 2019/0219815 A1 | 7/2019 | Price et al. |
| 2019/0235252 A1 | 8/2019 | Freedman et al. |

FOREIGN PATENT DOCUMENTS

| | | |
|---|---|---|
| WO | 9809267 A1 | 3/1998 |
| WO | 2011026005 A2 | 3/2011 |
| WO | 2013093510 A2 | 6/2013 |

\* cited by examiner

SCANNING DISPLAY SYSTEMS WITH PHOTONIC INTEGRATED CIRCUITS

This application claims the benefit of provisional application No. 62/731,448, filed Sep. 14, 2018, which is hereby incorporated by reference herein in its entirety.

BACKGROUND

This relates generally to display systems, including display systems containing microprojectors and displays.

Electronic devices and other systems often include displays. For example, a head-mounted device such as a pair of virtual reality or mixed reality glasses may have a display for displaying images for a user, or a projector system may include a projector for projecting light fields to a display. The projector may include light sources that emit light fields and an ancillary optical system that conveys the emitted light to the user.

It is challenging to form a projection and display system with sufficient optical brightness, display resolution, and compactness for a scalable use. Additional care must be taken to consider user cases that include drop shock and thermal loads.

SUMMARY

A display system such as a display system in an electronic device may display an image frame. The display system may include a scanning mirror and an array of staggered light emitting elements arranged in diagonal rows and aligned vertical columns. The staggered light emitting elements may emit light fields that propagate to a scanning via a lens. The scanning mirror may reflect the image light while rotating about an axis. Control circuitry may selectively activate the light emitting elements across tangential and sagittal axes of the image frame (e.g., using selected timing delays) while controlling the scanning mirror to scan across the sagittal axis at a scanning frequency. This may configure the reflected image light from the scanning mirror to appear as a continuous column of pixels from the image frame (e.g., continuous columns across the entire two-dimensional image frame).

Additional arrays of light emitting element staggered along the sagittal axis may be used if desired. The additional arrays may have a larger angular spacing to perform foveated imaging operations if desired. The additional arrays may include infrared emitters, optical emitters, and/or sensors to perform gaze tracking. The additional arrays may emit light of other colors.

In another suitable arrangement, the display system may include a fast scanning mirror and a slow scanning mirror that scan along tangential and sagittal axes of the projected display. That fast scanning mirror may receive multiple beams of light from a photonic integrated circuit. The photonic integrated circuit may receive light from multiple sets of laser dies (e.g., laser dies driven by a corresponding laser driver). The photonic integrated circuit may include channels that convey the light from the sets of laser dies and that emit the light as the multiple beams provided to the fast scanning mirror. The channels may have a wide pitch to accommodate the relatively large size of the laser dies and may reduce the pitch before emitting the beams to maximize resolution of the displayed image frame. The fast and slow scanning mirrors may fill the image frame with the beams of light.

DETAILED DESCRIPTION

Display systems may be integrated into electronic devices such as head-mounted devices or other electronic devices used for virtual reality and mixed reality (augmented reality) systems. These devices may include portable consumer electronics (e.g., portable electronic devices such as cellular telephones, tablet computers, glasses, other wearable equipment), head-up displays in cockpits, vehicles, etc., display-based equipment (projectors, televisions, etc.). The display system or the device in which the display system is located may include a projection system that may be used in other implementations where far-field projection of a light field is necessary. This may include, but is not limited to, wearable ocular devices, home theater applications, and virtual/mixed/augmented reality devices. The projection system described herein contains high resolution and foveated scanning capabilities that are flexible. These examples are, however, merely illustrative. Any suitable equipment may be used in providing a user or users with visual content using the display systems described herein.

A head-mounted device such as a pair of augmented reality glasses that is worn on the head of a user may be used to provide a user with computer-generated content that is overlaid on top of real-world content. The real-world content may be viewed directly by a user through a transparent portion of an optical system. The optical system may be used to route images from one or more pixel arrays in a display system to the eyes of a user. A waveguide such as a thin planar waveguide formed from a sheet of transparent material such as glass or plastic or other light guide may be included in the optical system to convey image light from the pixel arrays to the user. The display system may include reflective displays such as liquid-crystal-on-silicon displays, microelectromechanical systems (MEMs) displays (sometimes referred to as digital micromirror devices), or other displays.

Figure 1:
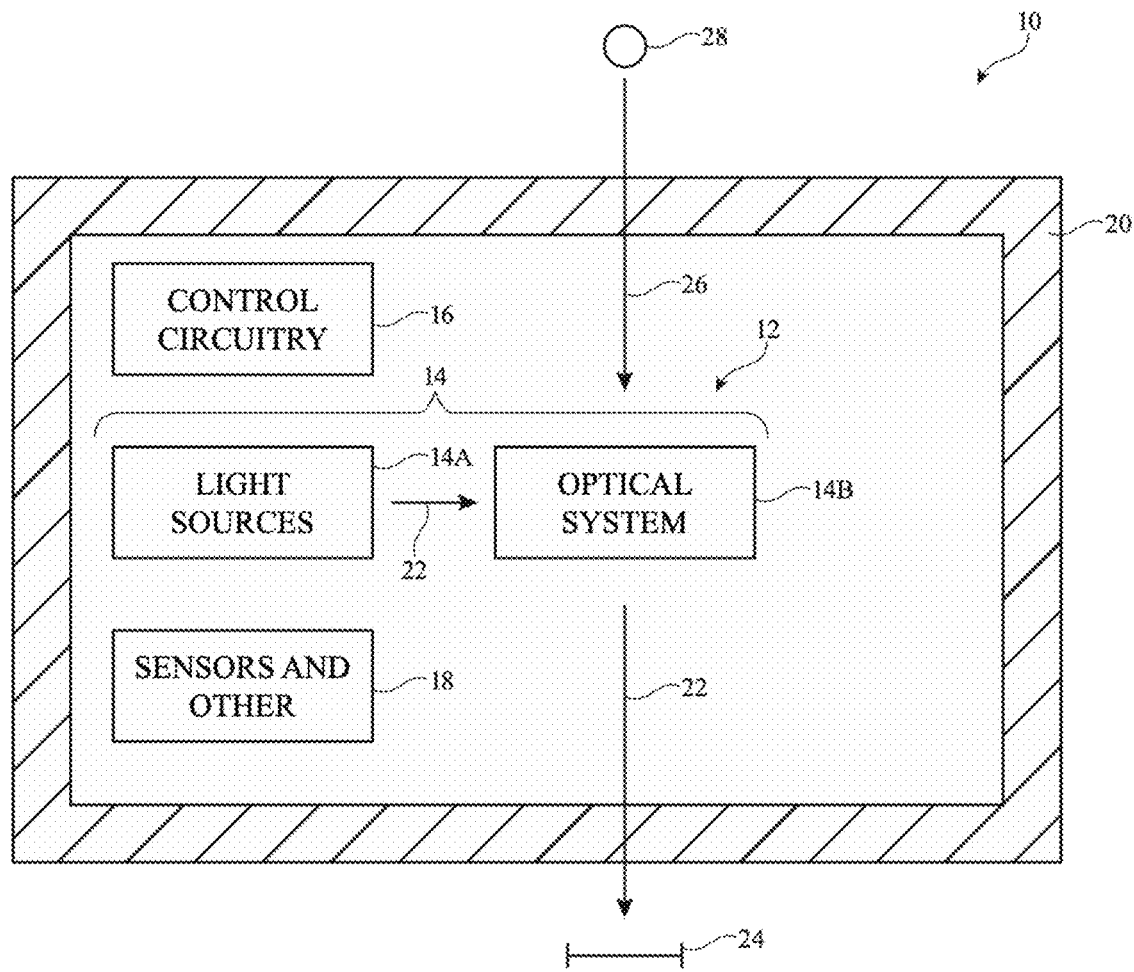
FIG. 1 is a diagram of an illustrative system that may include a display system in accordance with an embodiment.

A schematic diagram of an illustrative system that may be provided with a display system is shown in FIG. 1. As shown in FIG. 1, system 10 may be a home theater system, television system, head-mounted device, electronic device, or other system for projecting far field image light. System 10 may include support structures such as support structure 20. In scenarios where system 10 is a head-mounted device, support structure 20 may include head-mounted support structures. The components of system 10 may be supported by support structure 20. Support structure 20, which may sometimes be referred to as a housing or case, may be configured to form a frame of a pair of glasses (e.g., left and right temples and other frame members), may be configured to form a helmet, may be configured to form a pair of goggles, or may have other head-mountable configurations, or may be configured to form any other desired housing structures for some or all of the components in system 10.

The operation of system 10 may be controlled using control circuitry 16. Control circuitry 16 may include storage and processing circuitry for controlling the operation of system 10. Circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may be based on one or more microprocessors, microcontrollers, digital signal processors, baseband processors, power management units, audio chips, graphics processing units, application specific integrated circuits, and other integrated circuits. Software code may be stored on storage in circuitry 16 and run on processing circuitry in circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide system 10 with user input. Input-output devices 12 may also be used to gather information on the environment in which system 10 is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.).

As shown in FIG. 1, input-output devices 12 may include one or more displays in a display system such as display system 14. Display system 14, which may sometimes be referred to as a display or light engine, may be used to display images for a user or users of system 10. Display system 14 include light sources such as light sources 14A that produce illumination (image light) 22. Illumination 22 may pass through optical system 14B. Light sources 14A may include arrays of light sources having light emitting elements (e.g., pixels). Optical system 14B may include one or more scanning mirrors that scan the light emitted by the light emitting elements (light 22) towards one or more users at location 24 for viewing. In scenarios where system 10 is implemented on a head-mounted device, location 24 may be an eye box, for example. In scenarios where system 10 is implemented in other types of display-based devices, location 10 may be a projector screen or other display screen, a wall, or any other desired far-field location. Selectively activating the light elements in light sources 14A and scanning the mirrors across one or two dimensions (axes) may allow two-dimensional images to be projected at location 24 (e.g., across a field of view of at location 24).

Optical system 14B may include other optical components such as prisms, additional mirrors, beam splitters, holograms, gratings (e.g., electrically tunable gratings), lenses, waveguides, polarizers, and/or other optical components to convey light 22 to location 24. If desired, system 14B may contain components (e.g., an optical combiner, etc.) to allow real-world image light 26 (e.g., real-world images or real-world objects such as real-world object 28) to be combined optically with virtual (computer-generated) images such as virtual images in image light 22. In this type of system, which is sometimes referred to as an augmented reality system, a user of system 10 may view both real-world content and computer-generated content that is overlaid on top of the real-world content. Camera-based augmented reality systems may also be used in system 10 (e.g., in an arrangement which a camera captures real-world images of object 28 and this content is digitally merged with virtual content on display system 14). Display system 14 may be used in a virtual reality system (e.g., a system without merged real-world content) and/or any suitable type of system for projecting light to a desired display location.

In general, it is desirable to provide the scanning mirrors in optical system 14B as large a reflective area as possible (e.g., 1.2-2.0 mm in diameter) in order to maximize image resolution in the far-field domain. Smaller mirrors, for example, generate greater light divergence and thus lower resolution in the far-field than larger mirrors. At the same time, the scanning mirrors need to scan (rotate) at a relatively high speed (frequency) to allow the images to be displayed with a suitably high frame rate. However, scanning the mirrors at high speeds can cause physical deformation in the mirror (particularly for relatively large mirrors), which serves to diverge the image light and thus limit image resolution in the far-field. It would therefore be desirable to be able to provide optical systems 14B that can overcome these difficulties to provide high resolution (low divergence) images at high frame rates while still allowing the optical system to fit within the constrained form factor of system 10.

Figure 2:
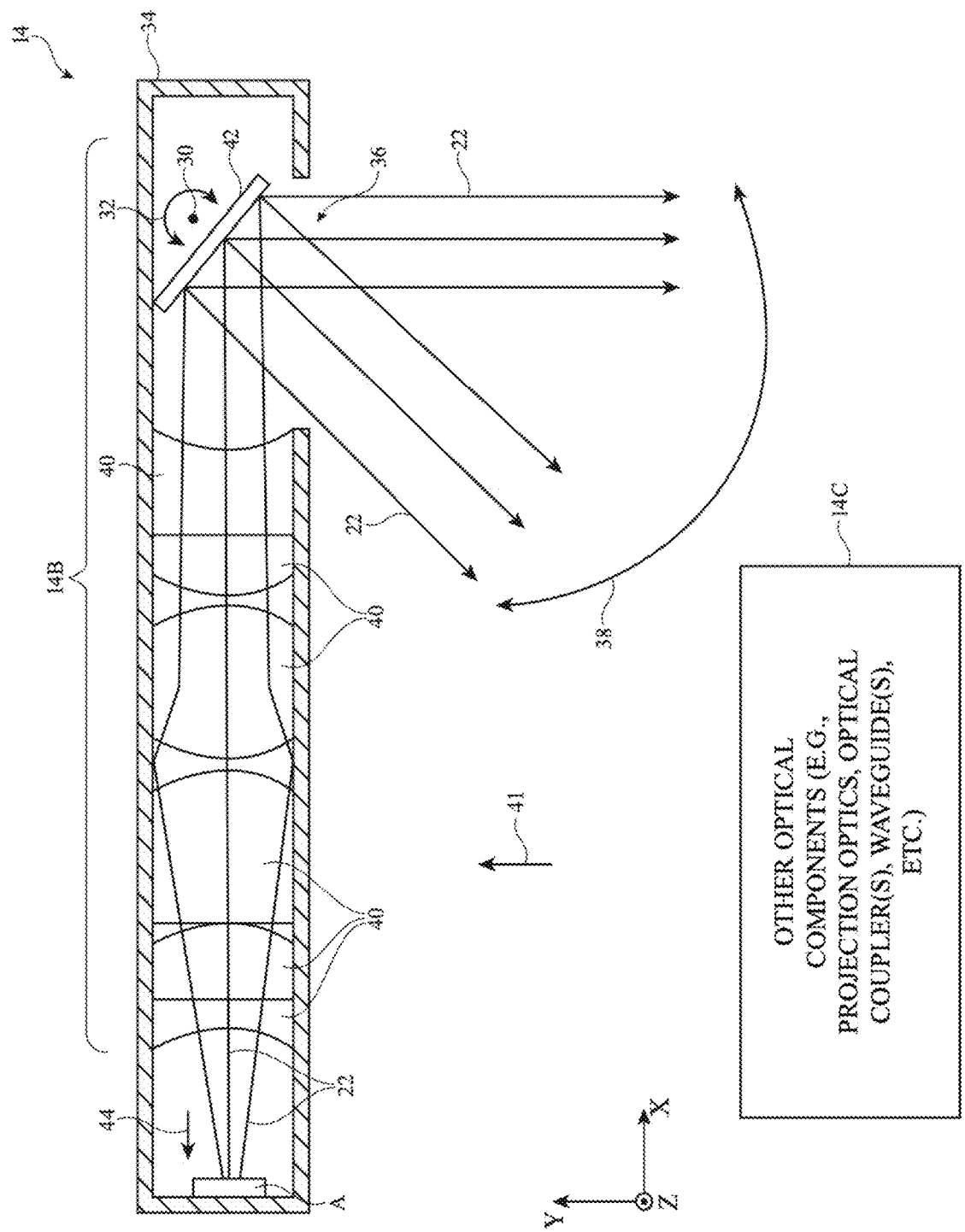
FIG. 2 is a top-down view of illustrative optical system components that include a scanning mirror for providing image light to a user in accordance with an embodiment.

FIG. 2 is a top-down view of display system 14 in an illustrative configuration in which optical system 14B includes a single scanning mirror. As shown in FIG. 2, optical system 14B may include lenses 40 and scanning mirror 42. Light sources 14A emit image light (light fields) 22 that propagate to scanning mirror 42 via lenses 40. Scanning mirror 42 rotates about axis 30 (extending parallel to the Z-axis of FIG. 2), as shown by arrows 32. Scanning mirror 42 may include a motor, actuators, MEMS structures, or any other desired structures that control mirror 42 to rotate around axis 30 with a desired scanning frequency. Scanning mirror 42 reflects light 22 towards other optical components 14C in display 14 and provides coverage over a corresponding field of view 38 as the mirror is scanned (rotated) about axis 30. Field of view 38 may be 45 degrees, between 40 and 50 degrees, less than 40 degrees, greater than 45 degrees, or any other desired field of view.

Other optical components 14C may include projection optics (e.g., optical components for projecting the image light on a display screen, projector screen, wall, or any other desired location 24 as shown in FIG. 1), lenses, beam splitters, optical couplers (e.g., input couplers, output couplers, cross-couplers, etc.), prisms, additional mirrors, holograms, gratings (e.g., electrically tunable gratings), waveguides, polarizers, and/or other optical components to convey light 22 to location 24 (FIG. 1). If desired, light sources 14A and optical system 14B may be mounted within an optical system housing such as housing 34. Housing 34 may include metal, dielectric, or other materials and may protect optical system 14B from misalignment, stray light, dust, or other contaminants. Housing 34 may include a window 36 that passes light 22 after being reflected off of scanning mirror 42.

In order to minimize far field light divergence and thus maximize far-field image resolution, scanning mirror 42 may rotate at a relatively low speed such as the frame rate with which images (image frames) are displayed using display system 14 (e.g., the frame rate of light sources 14A). As an example, scanning mirror 42 may rotate at 60 Hz, 120 Hz, 24 Hz, between 24 and 120 Hz, between 120 Hz and 240 Hz, greater than 120 Hz, or any other desired frequency. Because scanning mirror 42 rotates at a relatively low speed, scanning mirror 42 may perform scanning operations without causing significant mechanical deformation to the mirror, thereby maximizing mirror size (without introducing excessive deformation), minimizing far-field light divergence, and maximizing image resolution in the far-field. This horizontal scanning performed by mirror 42 (e.g., in the direction of arrows 32 around axis 30) may cause light 22 to fill (paint) one dimension of a two-dimensional image frame in the far field that is displayed using display system 14. This dimension is sometimes referred to herein as the sagittal axis of display system 14 or the sagittal axis of the displayed image. The axis orthogonal to the sagittal axis is used to fill (paint) the remainder of the two-dimensional image frame with image light and is sometimes referred to herein as the tangential axis of display system 14 or the tangential axis of the displayed image (e.g., parallel to the Z-axis of FIG. 2).

In some scenarios, an additional mirror is used to scan over the tangential axis. These tangential axis mirrors rotate at a higher frequency and can limit far-field image resolution. By omitting an additional mirror for covering the tangential axis in the example of FIG. 2, far-field image resolution may be maximized. In the example of FIG. 2, light sources 14A may include one or more arrays of light sources arranged in rows and columns. There may be significantly more rows M than columns N in each of the arrays (e.g., M may be at least 10, 20, 30, 40, 50, 100, 1000, etc. times N). Each array may therefore have insufficient width (parallel to the Y-axis of FIG. 2) to cover the entire sagittal axis of display system 14B, but has sufficient height (parallel to the Z-axis of FIG. 2) to cover the entire tangential axis of display system 14B. Arrays of this type may sometimes be referred to herein as 1.5 dimensional arrays or 1.5D arrays. Arrays that have less than 10 times the number of rows as columns may sometimes be referred to herein as 2D arrays. Arrays that have one row or one column may sometimes be referred to herein as 1D arrays.

Light sources 14A may include multiple 1.5D arrays (e.g., separate arrays for emitting different colors such as red (R), green (G), and blue (B) arrays). Control circuitry 16 (FIG. 1) may selectively activate (e.g., turn on/off) the light sources in each 1.5D array with a suitable timing scheme to fill (paint) the tangential axis of display system 14B with far-field light of each color. When combined with the sagittal axis rotation of scanning mirror 42, display system 14 may produce two-dimensional far-field images at a high frame rate and having multiple colors with maximal resolution.

Figure 3:
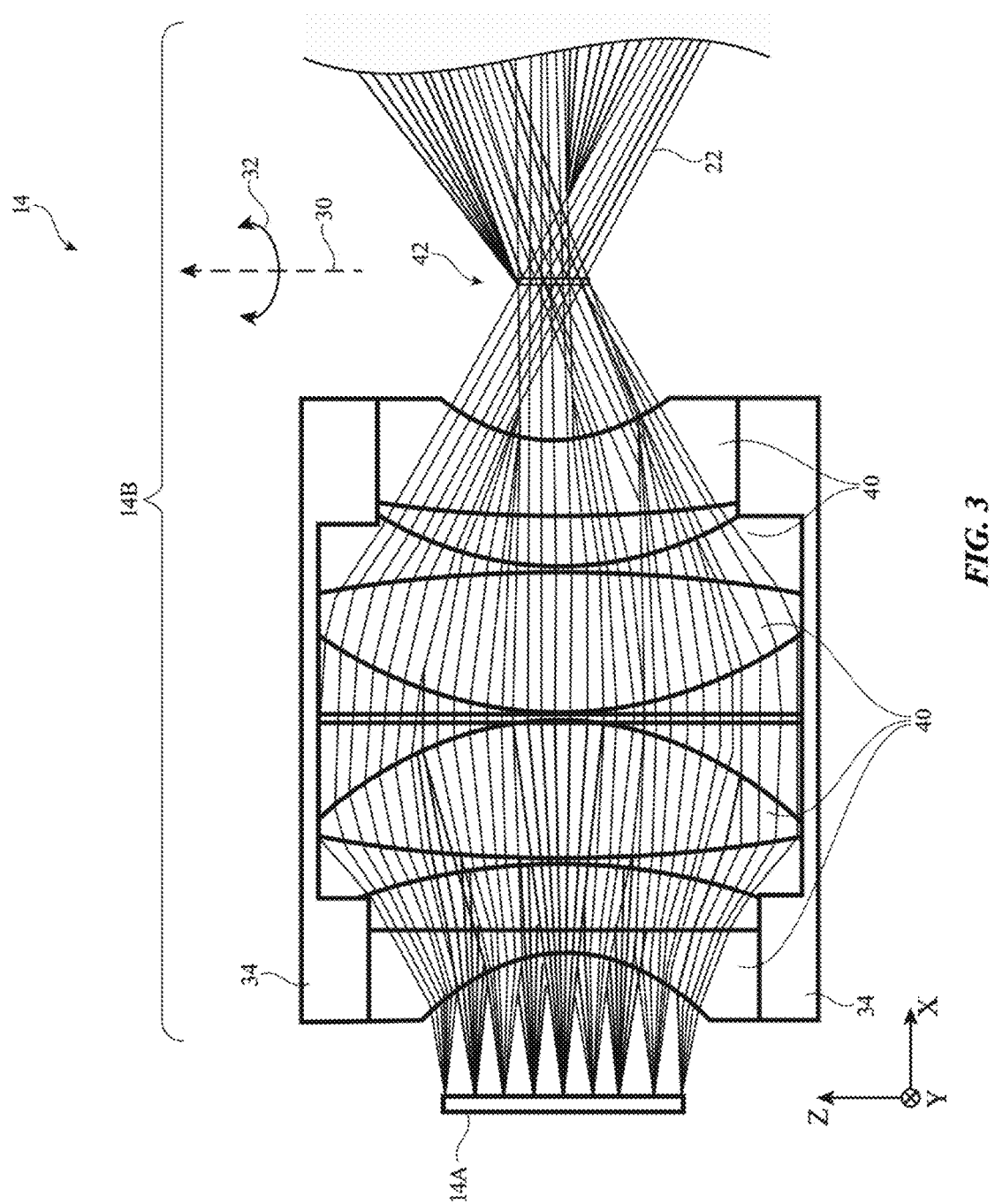
FIG. 3 is a cross-sectional side view of illustrative optical system components of the type shown in FIG. 2 in accordance with an embodiment.

FIG. 3 is a cross-sectional side view of display system 14 of FIG. 2 (e.g., as taken in the direction of arrow 41 of FIG. 2). As shown in FIG. 3, light sources 14A (e.g., the 1.5D arrays) have a greater height (parallel to the Z-axis) than width (parallel to the Y-axis) for covering the tangential axis of the display system. Output collimating optics 40 (e.g., multiple lenses) may collimate light 22 (e.g., ~0.4-1 mRad) from the arrays and may direct the light at scanning mirror 42. Scanning mirror 42 rotates around axis 30, as shown by arrows 32, to cover the sagittal axis. The selective activation of light sources across the 1.5D arrays in light sources 14A in combination with rotation of scanning mirror 42 allow light 22 to form a two-dimensional far-field image frame. In the example of FIG. 3, optical system housing 34 is shown as only enclosing lenses 40. This is merely illustrative and, if desired, housing 34 may also surround light sources 14A and/or scanning mirror 42 (e.g., as shown in FIG. 2). Lenses 40 may, for example, be split lenses (sometimes referred to herein as chopped optics or chopped lenses) that are cut in one or more dimensions rather than exhibiting a circular profile in the Y-Z plane (e.g., to help fit the lenses within a relatively narrow housing 34). Because the array of emitters are longer in one dimension (e.g., a non-scanning direction), lenses 40 may include chopped optics to help conserve space without affecting image quality.

Figure 4:
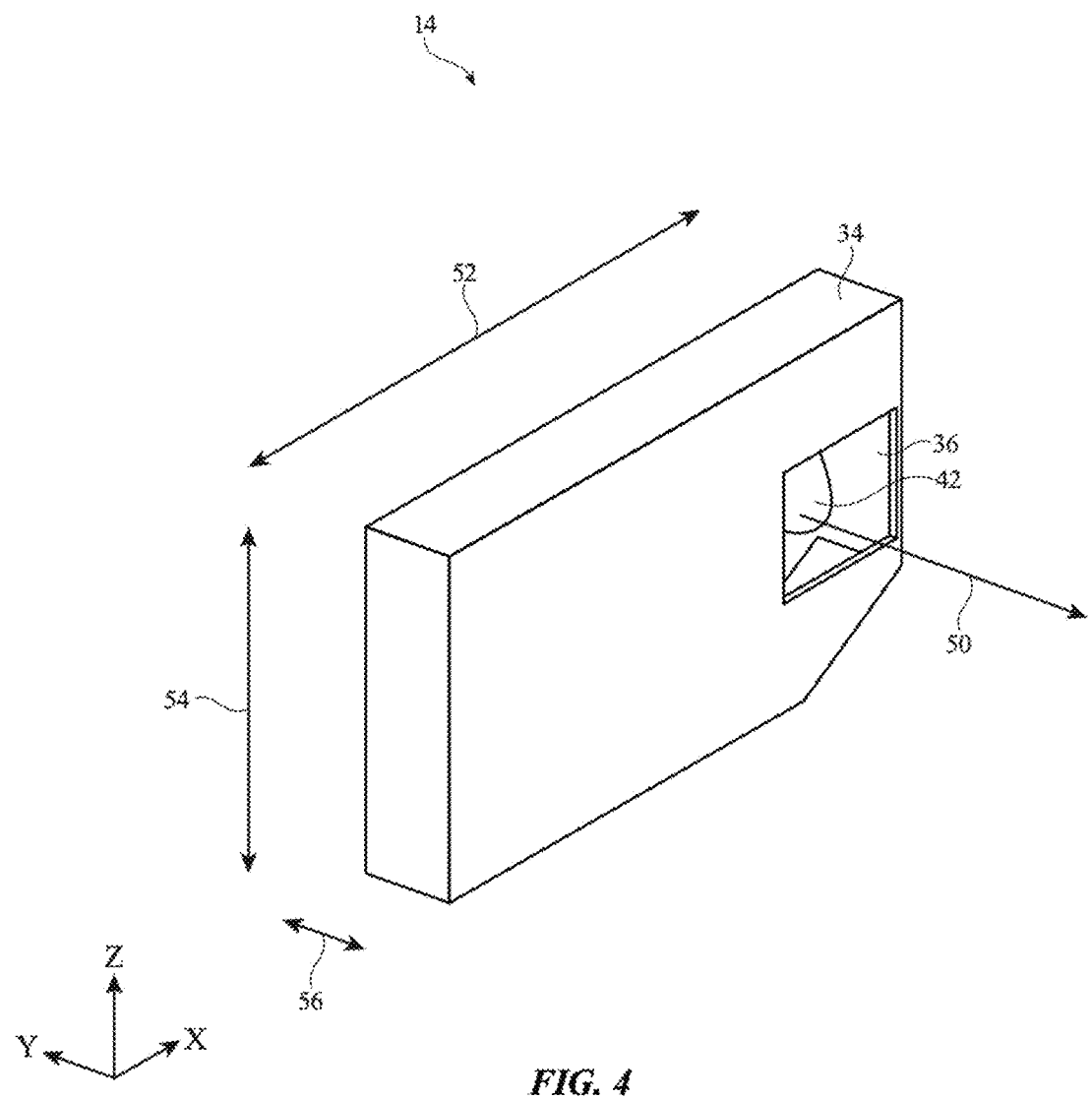
FIG. 4 is a perspective view showing how illustrative optical system components of the type shown in FIGS. 2 and 3 may be mounted within a narrow optical system housing in accordance with an embodiment.

FIG. 4 is a perspective view of display system 14 of FIGS. 2 and 3. As shown in FIG. 4, optical system housing 34 has a window 36. Scanning mirror 42 in housing 34 reflects light 22 through window 36, as shown by arrow 50 (e.g., to other optical components 14C of FIG. 2). Housing 34 may have a length 52, a width 56, and a height 54. Length 52 may be greater than height 54 and height 54 may be greater than width 56. As an example, length 52 may be 30-40 mm, 20-50 mm, 32-38 mm, greater than 50 mm, less than 20 mm, or any other desired length. Width 56 may be 4-6 mm, 3-10 mm, 5-20 mm, greater than 20 mm, or any other desired width. Height 54 may be 15-20 mm, 10-25 mm, 15-30 mm, greater than 30 mm, less than 15 mm, or any other desired height. In this way, housing 34, light sources 14A, and optical system 14B may exhibit a relatively narrow profile. This may allow display 14 to be integrated within systems 10 having relatively narrow profiles such as head mounted devices (e.g., within the temple of a glasses frame, helmet, goggles, etc.) or other miniaturized or portable display systems.

Figure 5:
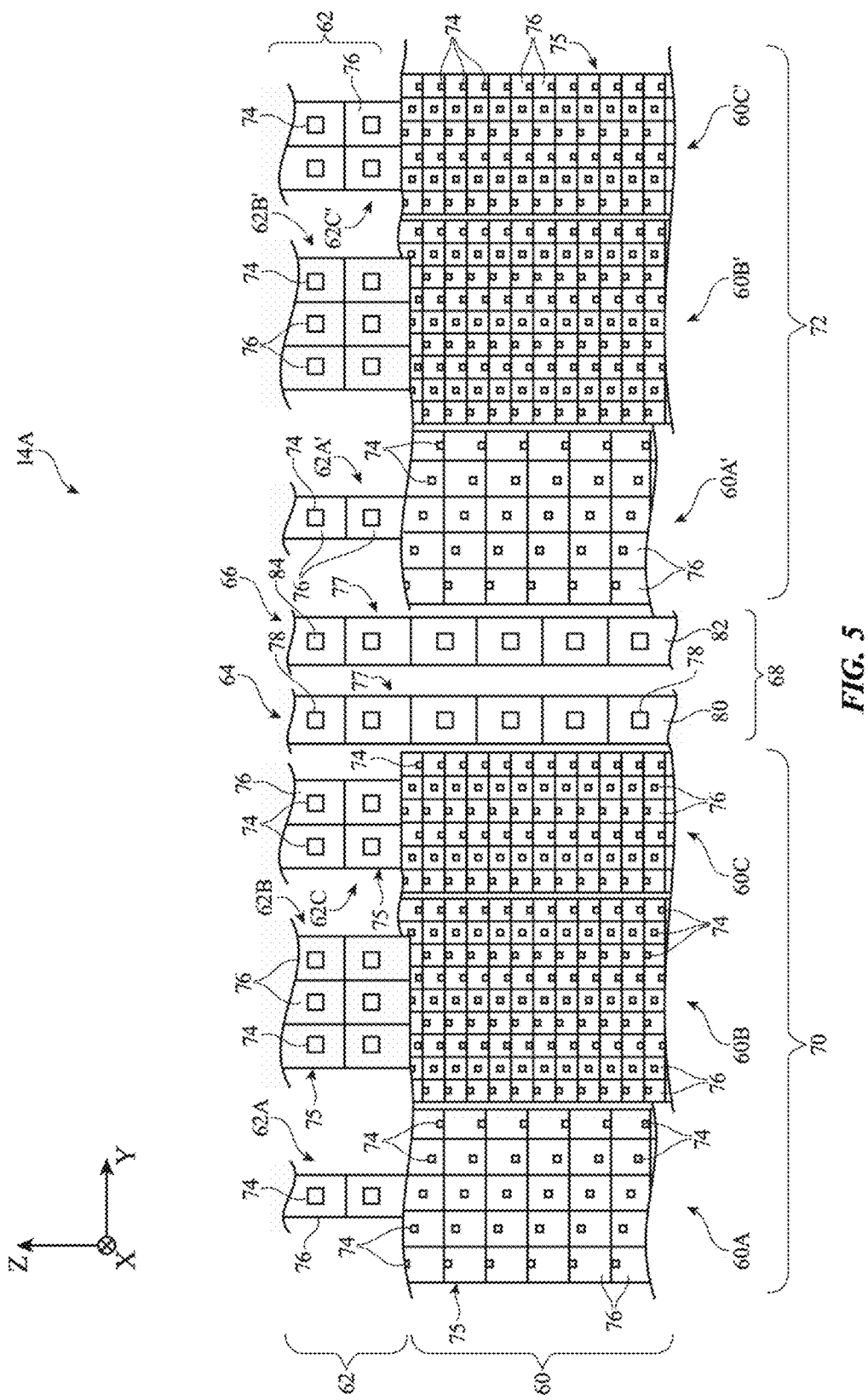
FIGS. 5 and 6 are front views of illustrative arrays of light sources having staggered light emitting elements in accordance with an embodiment.

FIG. 5 is a front view of light sources 14A in display 14 (e.g., as taken in the direction of arrow 44 of FIG. 2). As shown in FIG. 5, light sources 14A may include a light projector such as light projector 70. Light projector 70 includes one or more 1.5D arrays 60 of light sources 76 such as 1.5D arrays 60A, 60B, and 60C. The light sources 76 in each array 60 (sometimes referred to herein as light cells 76, light source cells 76, cells 76, or unit cells 76) may be arranged in a rectangular grid pattern having rows and columns. Because each array 60 is a 1.5D array, there are significantly more rows of cells 76 (e.g., extending parallel to the Y-axis) than columns of cells 76 (e.g., extending parallel to the Z-axis) in each array.

Each cell 76 may include a corresponding light emitting element 74 formed on an underlying substrate 75 (e.g., an array substrate such as a semiconductor substrate). Light emitting elements 74 may include light emitting diodes (LEDs), organic light emitting diodes (OLEDs), resonant cavity light emitting diodes (RCLEDs), micro light emitting diodes (µLEDs), lasers (e.g., vertical cavity surface emitting lasers (VCSELs)), or any other desired light emitting components. Different arrays 60 in projector 70 may include different types of light emitting elements 74 (e.g., one array 60 may include RCLEDs whereas another array 60 includes VCSELs, etc.). This may allow light any desired color to be emitted by projector 70 (e.g., in scenarios where a single type of light emitting element is not capable of producing light of a particular desired wavelength). Light emitting elements 74 may sometimes be referred to herein as pixels 74.

Each light emitting element 74 in each array 60 may emit light of a corresponding color (wavelength). As one example, the light emitting elements 74 in array 60A may emit red light (e.g., light at a wavelength between 625 nm and 740 nm such as 640 nm), the light emitting elements 74 in array 60B may emit green light (e.g., light at a wavelength between 495 nm and 570 nm such as 510 nm), and the light emitting elements 74 in array 60C may emit blue light (e.g., light at a wavelength between 420 nm and 495 nm such as 440 nm). In general, arrays 60 may emit light at any desired wavelengths (e.g., near-infrared light, visible light, infrared light, ultraviolet light, etc.).

If desired, one or more lower-resolution arrays such as low resolution arrays 62 (e.g., a first array 62A, a second array 62B, and a third array 62C) may be formed around the periphery of arrays 60 (e.g., at one or more sides of arrays 60). Low resolution arrays 62 may each include one or more columns and two or more rows of cells 76. Low resolution arrays 62 may include larger cells 76 than arrays 60 and light emitting elements 74 in arrays 62 may be spaced farther apart (e.g., provided with a greater pitch) than light emitting elements 74 in arrays 60 (e.g., arrays 62 may exhibit larger angular spreading than arrays 60). Low resolution arrays 62 may be, for example, 1D arrays, 1.5D arrays, and/or 2D arrays. The light emitting elements 74 in each array 62 may be the same color as the light emitting elements 74 in the adjacent array 60 (e.g., light emitting elements 74 in array 62A may emit the same wavelength of light as array 60A, light emitting elements 74 in array 62B may emit the same wavelength of light as array 60B, etc.).

Low resolution arrays 62 may generate portions of the image frame in the far field with greater angular spreading than arrays 60. This may allow for foveation techniques to be performed on the display images in which a central portion of the displayed image is provided at higher resolution than peripheral portions of the displayed image. This may, for example, mimic the natural response of the user's eye such that the displayed images still appear naturally to the user while also reducing the resources and data rate required to display the images. Foveation operations may also be performed by dynamically controlling the speed of scanning mirror 42. For example, control circuitry 16 may control scanning mirror 42 to spend more time within the center of the image frame (e.g., by rotating more slowly through the center of the frame) and less time around the periphery of the image frame (e.g., by rotating more rapidly at the periphery of the frame), thereby maximizing image resolution near the center of the frame while sacrificing image resolution near the periphery of the frame.

If desired, depth sensing and/or pupil tracking circuitry may be included in light sources 14A. In the example of FIG. 5, sources 14A include depth sensing and pupil tracking components 68. Components 68 may include an array 64 of infrared light sources 80. Each infrared (IR) light source 80 may include a corresponding infrared light emitting element 78 (e.g., an IR LED, an IR µLED, an IR VCSEL, etc.). Light sources 80 emit infrared light that is conveyed towards location 24 by optical system 14B (FIG. 1). The infrared light reflects off of the user's eye back towards light sources 14A through optical system 14B.

Components 68 of FIG. 5 may include an array 66 of infrared light sensors 82. Each infrared light sensor 82 may include a corresponding infrared light sensitive element 84 (e.g., an IR photodiode, an IR avalanche diode, etc.). Infrared light sensitive element 84 may sense the reflected infrared light and may provide corresponding infrared image signals to control circuitry 16. Control circuitry 16 may process the transmitted and received infrared signals to track the location of the user's retina (pupil) at location 24 (e.g., within an eye box), the direction of the user's gaze, to perform depth sensing, and/or to perform any other desired operations based on the transmitted and received infrared signals. Array 64 may include any desired number of cells 80 arranged in any desired pattern (e.g., array 64 may be a 1.5D array, a 1D array, a 2D array, etc.). Array 66 may include any desired number of cells 82 arranged in any desired pattern (e.g., array 66 may be a 1.5D array, a 1D array, a 2D array, etc.).

If desired, light sources 14A may perform wavelength multiplexing using an additional projector such as projector 72 of FIG. 5. Projector 72 may include a 1.5D array 60 for each array 60 in projector 70 (e.g., where each array 60 in projector 72 includes the same number and pattern of cells 76 as the corresponding array 60 in projector 70). In the example of FIG. 5, projector 72 includes 1.5D arrays 60 such as arrays 60A', 60B', and 60C'. Light emitting elements 74 in array 60A' may emit light that is offset in wavelength from the wavelength emitted by array 60A by a predetermined margin (e.g., 20 nm, 30 nm, 40 nm, between 20 and 50 nm, between 10 and 60 nm, etc.). Similarly, array 60B' may emit light that is offset in wavelength from the wavelength emitted by array 60B and array 60C' may emit light that is offset in wavelength from the wavelength emitted by array 60C by the predetermined margin (e.g., array 60A' may emit 670 nm red light, array 60B' may emit 540 nm green light, and array 60C' may emit 470 nm blue light).

Using an additional wavelength-offset projector such as projector 72 may allow display 14 to perform two different operations on the light emitted by light sources 14A. For example, other optical components 14C (FIG. 2) may include holograms, diffraction gratings, or other structures that are tuned to operate on light of a particular wavelength. Optical components 14C may, for example, include a first hologram that operates on (e.g., diffracts in a first direction) the wavelengths of light produced by projector 70 and a second hologram that operates on the (e.g., diffracts in a second direction) the wavelengths of light produced by projector 72. This may, for example, allow display 14 to display RGB image light that is transmitted to different locations within system 10 using the same physically-narrow light sources 14A.

The example of FIG. 5 is merely illustrative. In general, any desired number of projectors may be formed within light sources 14A. Any desired number of arrays 60 may be formed within each projector. Each array 60 may include any desired number of cells 76 arranged in any desired pattern. Each array 62 may include any desired number of cells 76 arranged in any desired pattern. One or more of the arrays 60 and/or 62 of FIG. 5 may be omitted. Projector 72 of FIG. 5 may be omitted if desired.

As shown in FIG. 5, the light emitting elements 74 within each array 60 are horizontally aligned with respect to the light emitting elements 74 in the same column of cells 76 but are vertically staggered with respect to the light emitting elements 74 in the same row of cells 76. For example, the light emitting elements 74 in each column may be located at different positions along the Z-axis (tangential axis) from the previous column of cells 76 and the next column of cells 76. In other words, light emitting elements 74 are vertically staggered within each array 60 (e.g., light emitting elements 74 in each array 60 collectively form a staggered array of light emitting elements having vertical columns and diagonal rows). If desired, there may be multiple copies of each of the light emitting elements 74 shown in each diagonal row of FIG. 5 (e.g., to increase brightness and/or dynamic range relative to scenarios where each column of the diagonal row includes only one light emitting element 74). Staggering light emitting elements 74 in this way may allow arrays 60 to exhibit a fine vertical pitch such that light elements 74 can fill the tangential axis of display system 14 (e.g., parallel to the Z-axis of FIG. 5) with light even though only a single scanning mirror is used to scan parallel to the Y-axis (sagittal axis). This may further serve to maximize the resolution of the projected far-field image.

Figure 6:
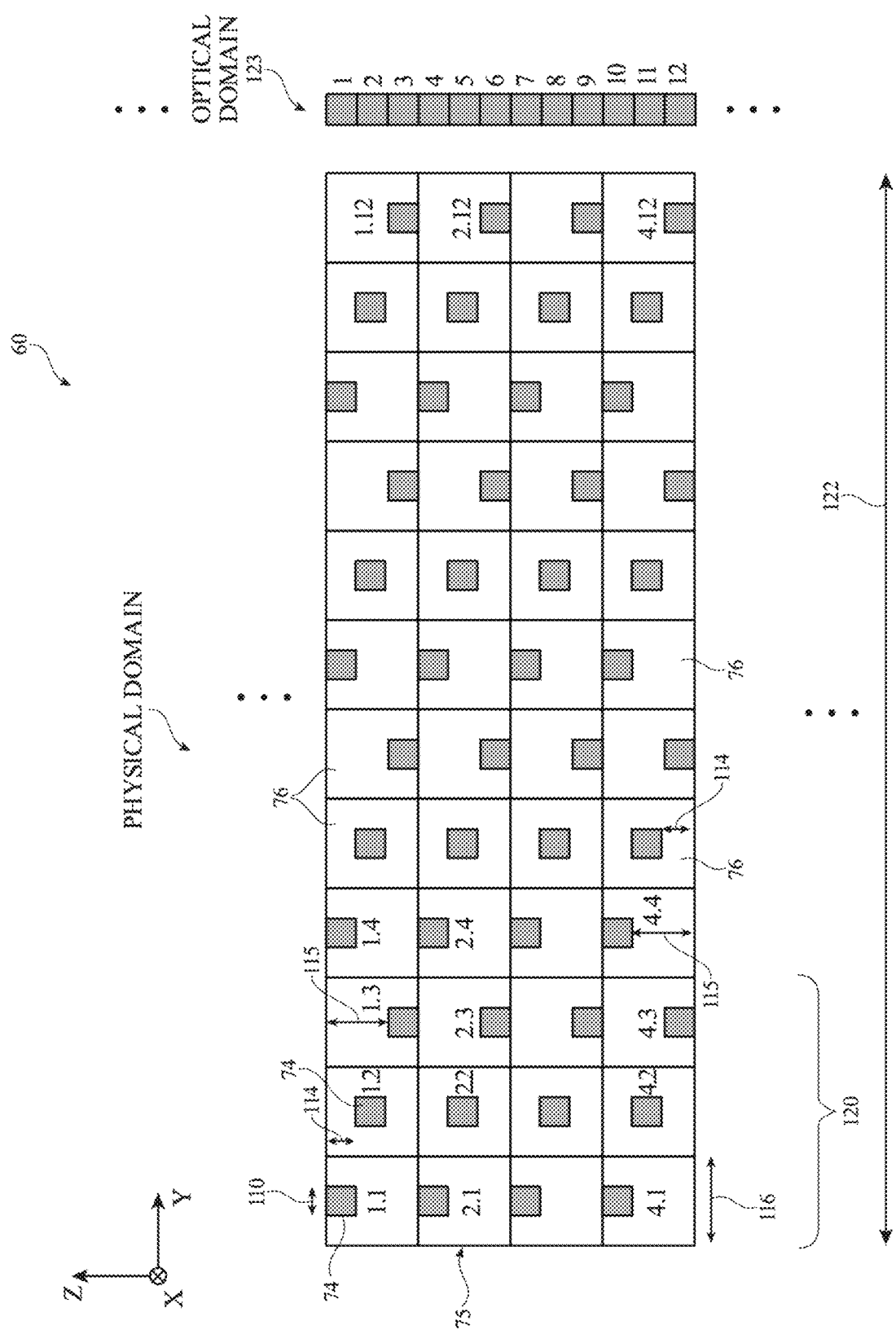

FIG. 6 is a front-view of a given array 60 showing how light emitting elements 74 may be staggered in the physical domain while being vertically continuous in the optical domain due to the rotation of scanning mirror 42. The left side of FIG. 6 illustrates the physical domain of an exemplary four-by-twelve cell portion of a given array 60 (e.g., as taken in the direction of arrow 44 of FIG. 2). The right side of FIG. 6 illustrates the optical domain of the light emitted by the four-by-twelve cell portion of array 60 (e.g., as viewed from optical components 14C of FIG. 2 after reflection by scanning mirror 42).

As shown in FIG. 6, each light emitting element 74 may be formed in substrate 75 of array 60 and has a corresponding pixel size (optical pitch) 110. Each light emitting element 74 in the even-numbered columns may be vertically offset from the light emitting element 74 immediately to its left and the light emitting element 74 immediately to its right by pixel offset 114. In the example of FIG. 6, the light emitting element at position (1,2) is vertically offset from the light emitting element at position (1,1) by pixel offset 114. Similarly, the light emitting element at position (1,3) is vertically offset from the light emitting element at position (1,2) by pixel offset 114 and is vertically offset from the light emitting element at position (1,1) by offset 115 (e.g., twice pixel offset 114). Offset 114 may separate the light emitting element at position (1,2) from the light emitting element at position (1,1) and the light emitting element at position (1,3) by relatively small distance (pixel pitch) along the Z-axis (e.g., within 4-6 microns, between 3 and 10 microns, between 3 and 6 microns, etc.). This pattern may repeat one or more times across width 122 of array 60 for each row.

In this way, each row includes one or more (repeating) sets 120 of cells 76 that include staggered light emitting elements 74 extending across the entire physical row of cells 76 (e.g., parallel to the Z-axis of FIG. 6). The sum of the pixel pitches 114 in each set 120 may, for example, be approximately equal to the distance from the bottom edge to the top edge of the corresponding row (e.g., minus the pixel pitch between the light emitting elements in the set). Each row may include any desired number of sets 120. Each set 120 may include any desired number of cells 76 (e.g., three cells and three offset (staggered) light emitting elements 74 extending across the height of the row, four cells and four offset light emitting elements 74 extending across the height of the row, five cells and five offset light emitting elements 74 extending across the height of the row, more than five cells, two cells, etc.)

Each cell 76 has electrical (physical) pitch 116. Electrical pitch 116 may accommodate routing components used to control the operation of light emitting elements 114. In general, it may be desirable for pixel size 110 to be relatively small. A larger electrical pitch 116 may allow sufficient space to accommodate electrical routing, thermal cooling, current density optimization, and contact resistance for the relatively small light emitting elements 114. Electrical pitch 116 may be, for example, between 30 and 50 microns, between 10 and 50 microns, between 35 and 45 microns, approximately 40 microns, etc. (e.g., in scenarios where light elements 74 are formed using VCSELs).

Control circuitry 16 may selectively activate different sets of light emitting elements 74 in array 60 (e.g., using selected timing delays across the rows and columns of the array) while simultaneously controlling the rotational frequency of scanning mirror 42 to display any desired high resolution image frame in the far-field (e.g., by synchronizing the timing/delays of pixel activation with the scanning mirror frequency and utilizing the large height of the 1.5D arrays to cover the second dimension (tangential axis) of the image frame). By physically staggering light emitting elements 74, controlling the timing of light emitting elements 74, and controlling scanning mirror 42 in this way, light emitting elements 74 in array 60 may appear as a single continuous column of light emitting elements (e.g., elements 74 may produce visually continuous image data that forms the displayed image) in the optical domain after reflection by scanning mirror 42 (e.g., as shown by diagram 123). This may allow light emitting elements 74 in the 1.5D array, when combined with sagittal axis scanning by mirror 42, to fill out (paint) a high resolution, high frame-rate, two-dimensional image frame in the far-field (optical) domain (e.g., at other optical components 14C of FIG. 2). The optical domain 123 of the image frame may exhibit an ultra-fine optical resolution (e.g., greater than 2048×1080 resolution with a 3-6 micron effective pixel pitch) despite a coarser physical (electrical) pitch 116 on arrays 60 (e.g., for accommodating signal routing, thermal dissipation, etc.).

If desired, control circuitry 16 may dynamically change the brightness of different subsets of the light elements 74 in array 60 (e.g., using pulse width modulation schemes, by adjusting current supplied to the light emitting elements, by adjusting the source duty cycle, etc.). This may allow control circuitry 16 to locally brighten some or all of the displayed far-field image as needed (e.g., so that relatively bright images are displayed when the user is in a bright room and so that relatively dim images are displayed to conserve power when the user is in a dark room). The operation of array 60 and scanning mirror 42 allows light emitting elements 74 to be turned on most of the time, thereby maximizing the average brightness and visibility of the displayed images. Display system 14 may support a brightness of thousands of nits, for example.

Figure 7:
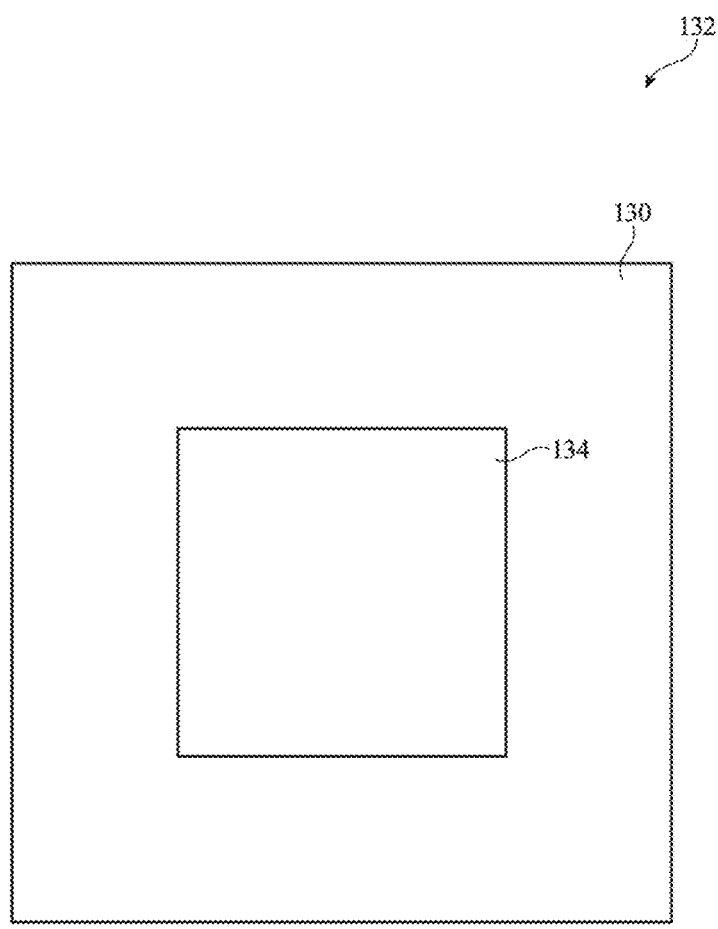
FIG. 7 is a diagram showing how an image displayed by an illustrative display may include a high definition foveated region surrounded by a lower resolution region in accordance with an embodiment.

FIG. 7 is a diagram of an illustrative foveated image frame that may be displayed by display 14 (e.g., in the optical domain). As shown in FIG. 7, image frame 132 may include a high definition foveated region 134 at the center of the frame. Region 134 is surrounded by a lower resolution peripheral region 130. Region 134 may be produced using high resolution arrays 60 (FIG. 5) whereas region 130 is produced using lower resolution arrays 62, for example. Generating an image frame of this type using display system 14 may allow display system 14 to conserve resources while still providing image frames that appear natural to a viewer due to perceived blurring at the periphery of the user's field of view.

Figure 8:
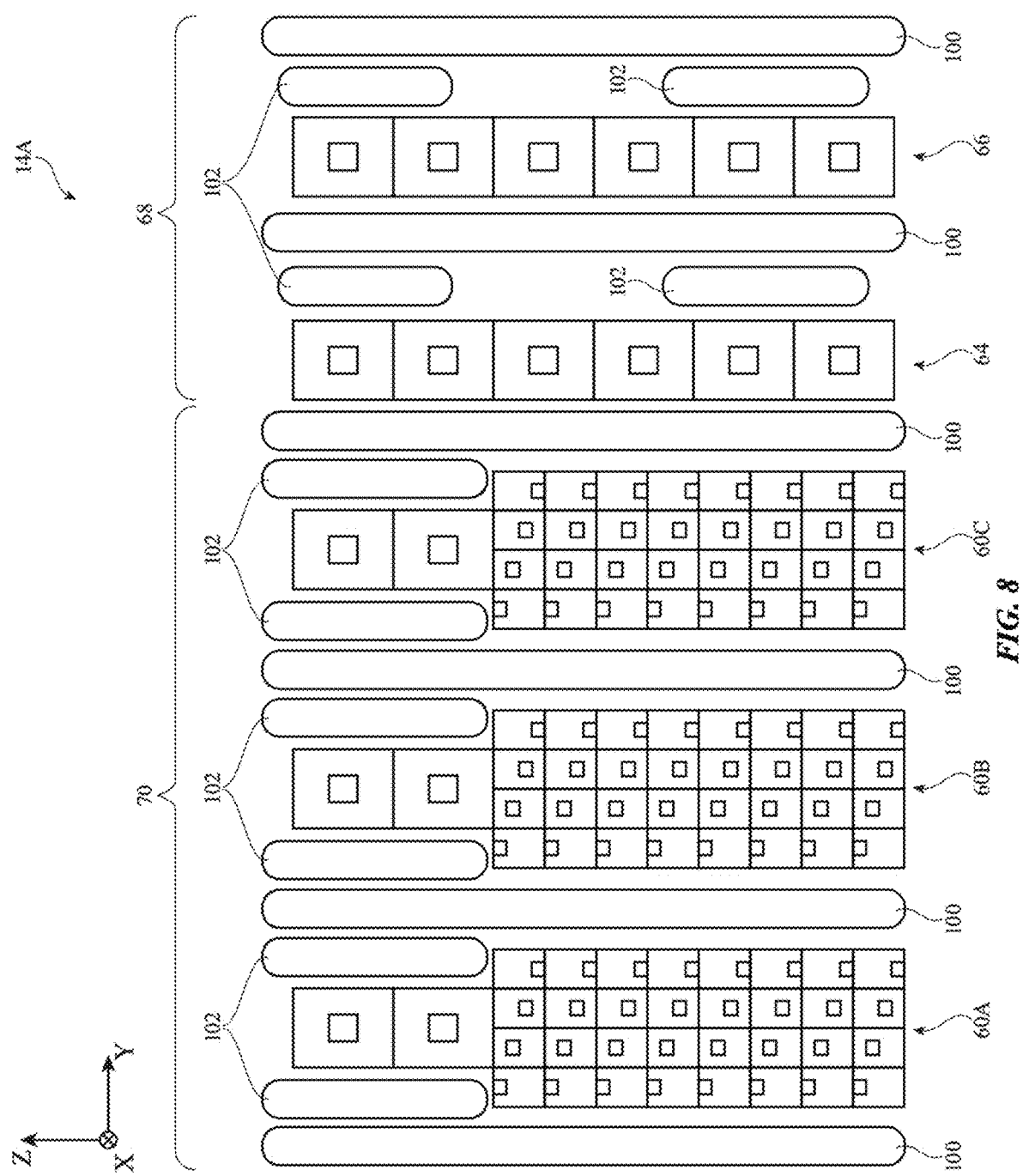
FIG. 8 is a front view showing how illustrative light source control circuitry and interconnected circuitry may be formed between arrays of light sources in accordance with an embodiment.

FIG. 8 is a front view of projector 70 and components 68 of FIG. 5 showing how routing circuitry and light source powering circuitry may be interposed between the arrays of light sources 14A. As shown in FIG. 8, routing (interconnect) circuitry 100 may extend between arrays 60, 62, 64, and 66 in projector 70. Routing circuitry 100 may convey control signals that turn the light emitting elements in the arrays on or off, that adjust the brightness of the light emitting elements, and/or that gather sensor signals using sensor components in the arrays (e.g., infrared photodiodes in array 66). Control circuitry 102 may also be located between arrays 62 or between other arrays in components 14A. Control circuitry 102 may include synchronization and power integrated circuits (e.g., application specific integrated circuits) and any other desired circuitry associated with powering or controlling components 14A. The example of FIG. 8 is merely illustrative and, in general, routing circuitry and control circuitry may be mounted at any other desired locations.

Figure 9:
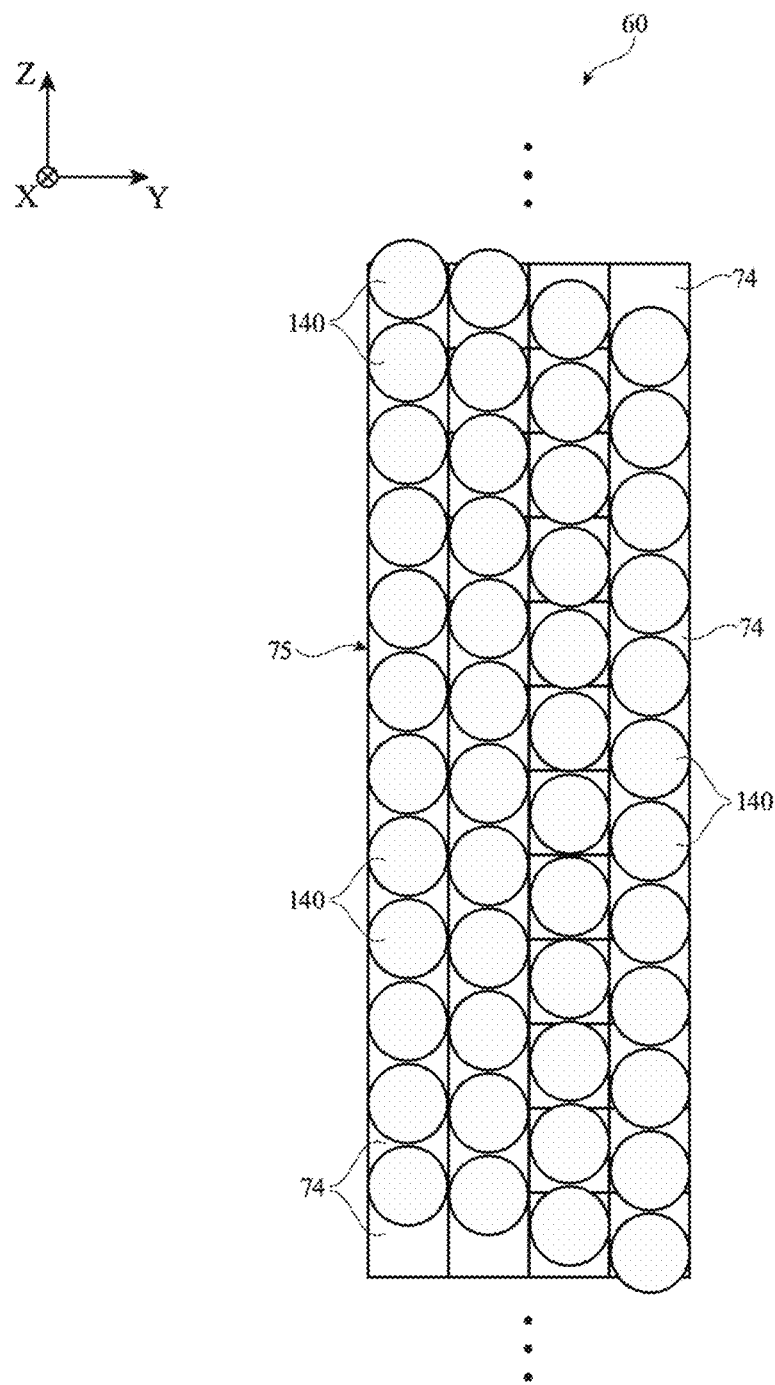
FIG. 9 is a front view of an illustrative array of light sources having staggered light emitting elements and microlenses overlapping each of the light emitting elements in accordance with an embodiment.

If desired, microlenses may be provided over each light emitting element in components 14A for directing the light emitted by the light emitting elements. FIG. 9 is a front view of a given array 60 that is provided with microlenses. As shown in FIG. 9, microlenses such as microlenses 140 may be located (e.g., centered) over each light emitting element 74 in array 60 (e.g., each element 74 may have a corresponding microlens 140). Like elements 74, microlenses 140 are vertically staggered column-to-column.

Figure 10:
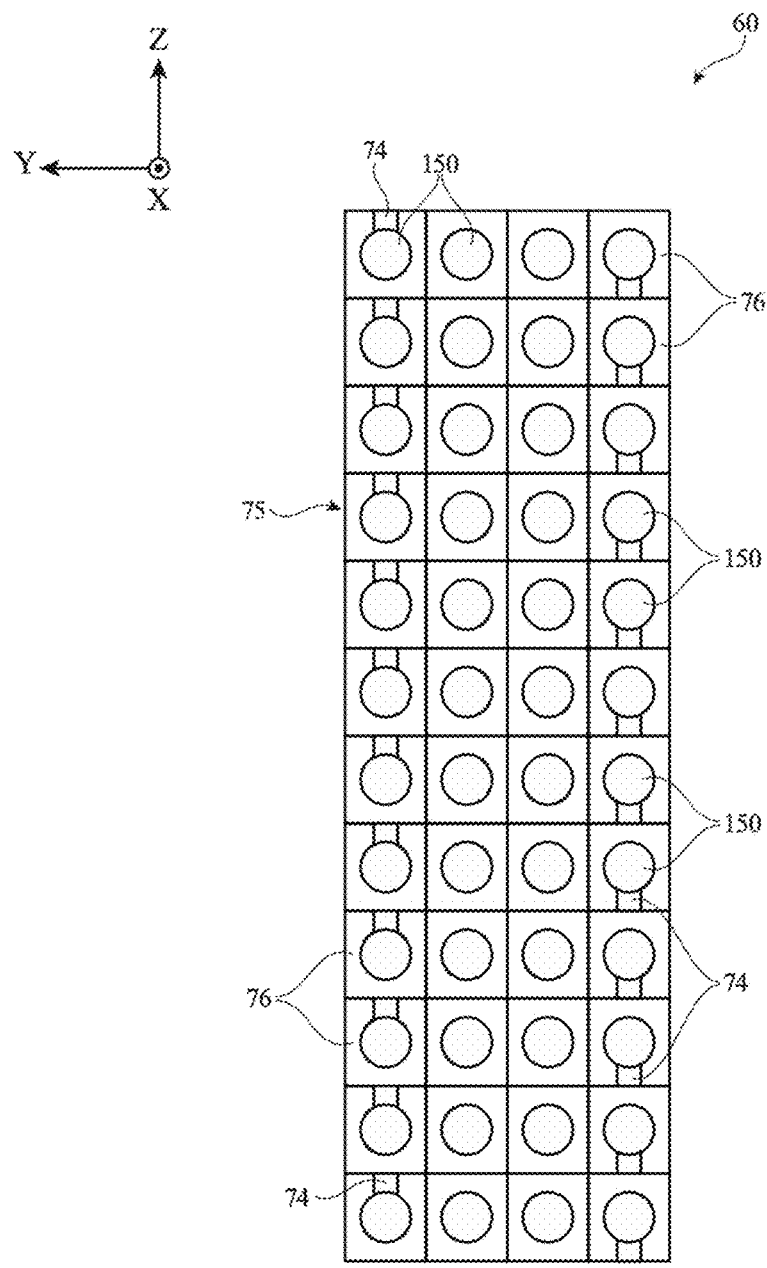
FIG. 10 is a rear view of an illustrative array of light sources having contact pads overlapping the center of each light source in the array and having staggered light emitting elements in accordance with an embodiment.

Each cell 76 in array 60 may be coupled to driver circuitry such as a driver integrated circuit over a corresponding contact pad. While microlenses 140 are aligned with light emitting elements 74, each cell 76 in array 60 may include a contact pad that is centered with respect to the physical area of the cell. FIG. 10 is a rear view of a given array 60 that is provided with contact pads for coupling to a driver integrated circuit. As shown in FIG. 10, each cell 76 in array 60 includes a corresponding contact pad 150 that is centered with respect to that cell 76. Contact pads 150 may convey drive signals to selectively activate (or deactivate) the light emitting element 74 within the corresponding cell. Unlike microlenses 140 of FIG. 9, contact pads 150 are not vertically staggered column-to-column (e.g., to simplify packaging with the underlying driver integrated circuit).

Figure 11:
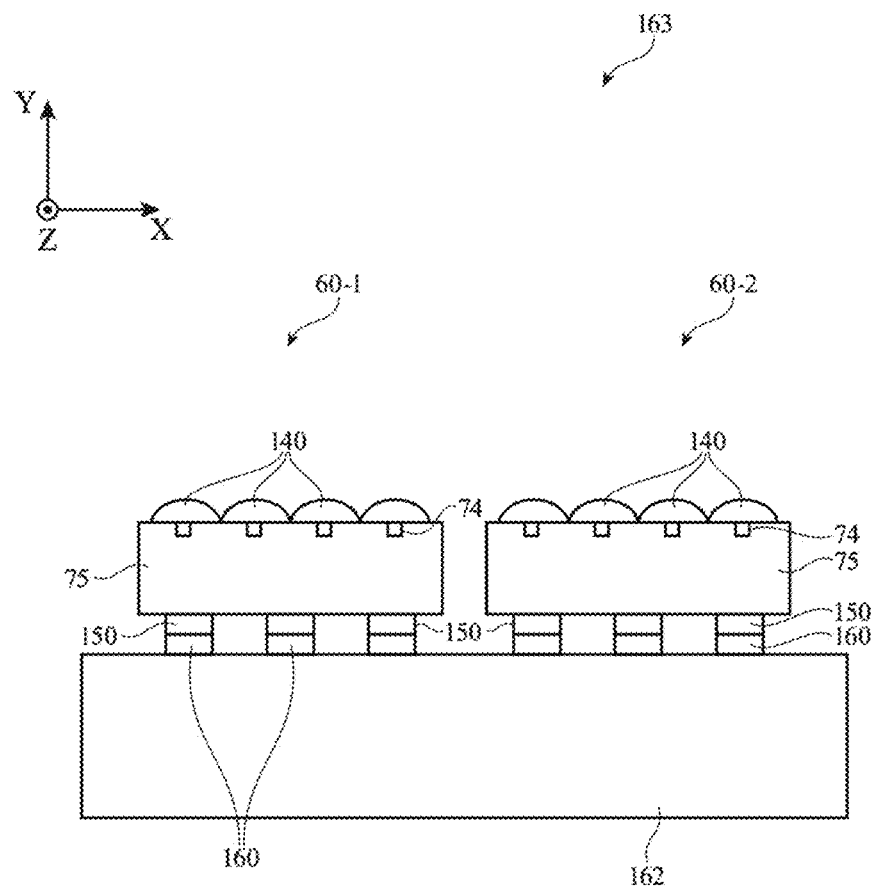
FIG. 11 is a cross-sectional side view of illustrative arrays of light sources of the types shown in FIGS. 5-10 in accordance with an embodiment.

FIG. 11 is a side view showing how two arrays 60 such as a first array 60-1 and a second array 60-2 may be coupled to an underlying driver integrated circuit. As shown in FIG. 11, contact pads 150 on the bottom surface of substrate 75 in first array 60-1 are coupled to corresponding contact pads 160 on driver integrated circuit 162 (e.g., an application specific integrated circuit such as an active-matrix driver integrated circuit). Similarly, contact pads 150 on the bottom surface of substrate 75 of second array 60-2 are coupled to corresponding contact pads 160 on driver integrated circuit 162. Contact pads 150 may be connected to contact pads 160 using solder balls, a ball grid array, or any other desired conductive interconnect structures. Collectively, arrays 60 and integrated circuit 162 may form a display (light source) integrated circuit package 163.

Figure 12:
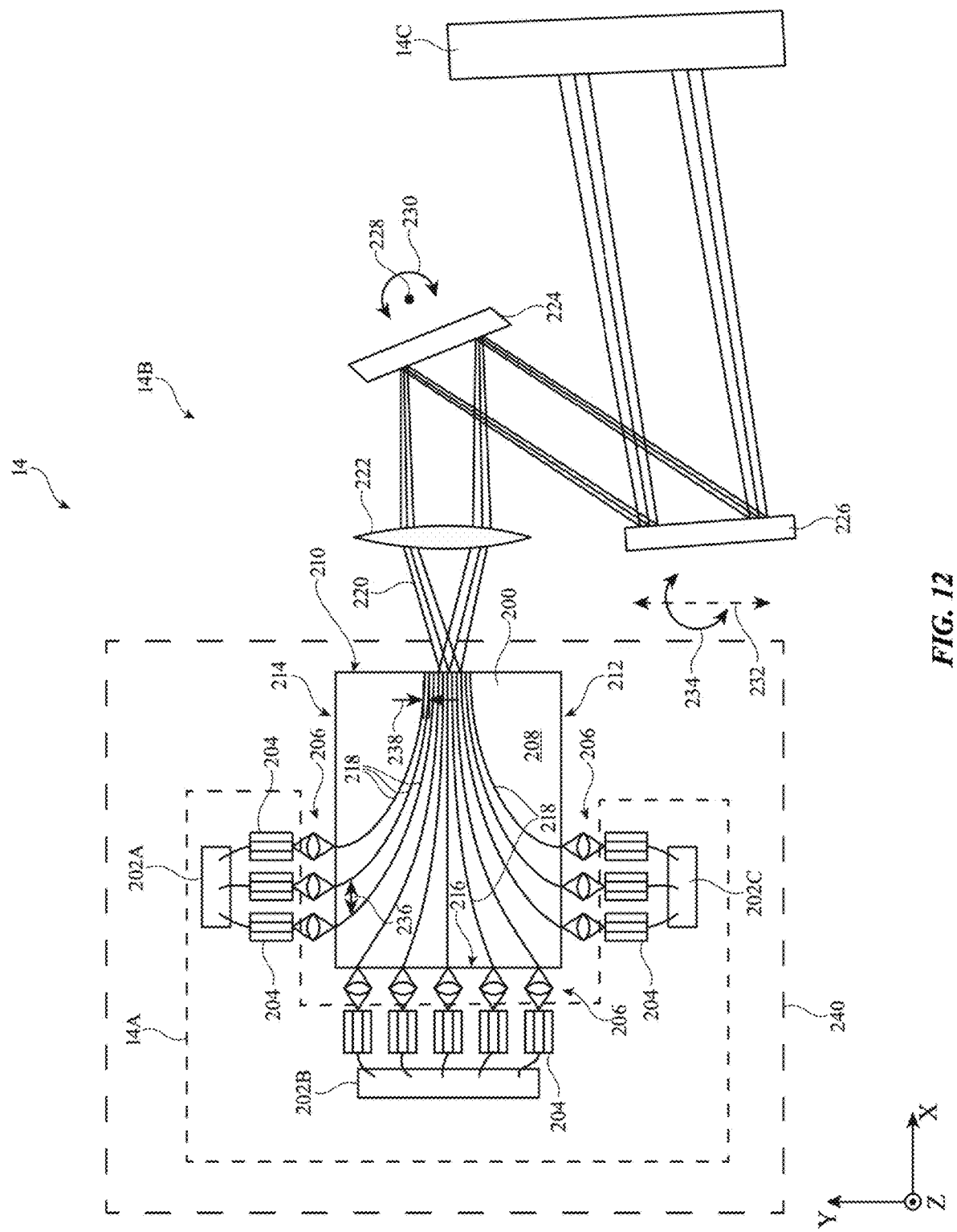
FIG. 12 is a top-down view of illustrative optical system components that include two independent scanning mirrors and a photonic integrated circuit for providing image light to a user in accordance with an embodiment.

If desired, display system 14 may include two scanning mirrors for displaying images. FIG. 12 is a top-down view of display system 14 in an example where display system 14 includes two scanning mirrors such as a first scanning mirror 224 and a second scanning mirror 226. As shown in FIG. 12, light sources 14A include multiple sets (groups) of laser dies 204 each coupled to a corresponding laser driver 202. For example, light sources 14A may include a first set of laser dies 204 coupled to and controlled by driver circuit 202A, a second set of laser dies 204 coupled to and controlled by driver circuit 202B, and a third set of laser dies 204 coupled to and controlled by driver circuit 202C. The laser dies 204 in each set may produce light of different wavelengths so that each driver circuit 202 contributes light of a particular color to display system 14. Laser dies 204 may, for example, include edge-emitting laser dies.

As shown in FIG. 12, optical system 14B may include coupling lenses 206, photonic integrated circuit (PIC) 200, one or more collimating optics 222 (e.g., one or more collimating lenses), first scanning mirror 224, and second scanning mirror 226. Photonic integrated circuit 200 (sometimes referred to herein as photonic light wave circuit (PLC) 200) may include a substrate 208 such as a glass substrate. Photolithography techniques may be used to produce photolithographic patterns (channels) 218 in substrate 208. Channels 218 may have a different index of refraction than the surrounding material in substrate 208, for example.

Each coupling lens 206 may be used to couple the light emitted from a corresponding laser die 204 into a respective one of channels 218. For example, lenses 206 may couple the light emitted by the laser dies 204 coupled to driver 202A into channels 218 at side 214 of PIC 200, lenses 206 may couple the light emitted by the laser dies 204 coupled to driver 202B into channels 218 at side 216 of PIC 200, and lenses 206 may couple the light emitted by the lasers 204 coupled to driver 202C into channels 218 at side 212 of PIC 200.

Channels 218 have a relatively large pitch 236 at sides 214, 216, and 212 of PIC 200 to accommodate the large size of laser dies 204. However, in order to maximize the resolution of the displayed image, channels 218 may guide the light through PIC 200 to edge 210, where channels 218 exhibit a reduced pitch 238. Pitch 238 may be, for example, between 10 microns and 20 microns, approximately 12 microns, between 8 microns and 16 microns, less than 8 microns, greater than 20 microns, between 5 microns and 20 microns, etc. Channels 218 may convey the light from laser dies 204 through PIC 200 to surface 210 (e.g., via total internal reflection), where the light is emitted from PIC 200 as light 220.

Light fields emitted by PIC 200 may propagate to scanning mirror 224 via collimating optics 222. Scanning mirror 224 may scan (rotate) around axis 228 (as shown by arrows 230) at a relatively fast frequency (e.g., across the sagittal axis of the displayed image). Scanning mirror 224 may therefore sometimes be referred to herein as fast scanning mirror 224 or fast mirror 224, and the sagittal axis may sometimes be referred to herein as the fast scan axis or the fast axis. Scanning mirror 224 reflects light 220 towards scanning mirror 226. Scanning mirror 226 may scan (rotate) around axis 232 (as shown by arrows 234) at a relatively slow (low) frequency (e.g., across the tangential axis of the displayed image). Scanning mirror 226 may therefore sometimes be referred to herein as slow scanning mirror 226 or slow mirror 226, and the tangential axis may sometimes be referred to herein as the slow scan axis or the slow axis. Axes 228 and 232 may be orthogonal (e.g., because the tangential and sagittal axes of the display are orthogonal). By scanning both mirrors 226 and 224 simultaneously, light 220 may be swept across both the tangential and sagittal axes of the display image to fill out (paint) a two dimensional image in the far-field (e.g., at other optical components 14C).

The light from the laser dies 204 coupled to driver 202A may be spatially offset from the light from the laser dies 204 coupled to driver 202B, which may be spatially offset from the light from the laser dies 204 coupled to driver 202C at edge 210 of PIC 200 (e.g., due to the pitch of channels 218 in PIC 200). This allows three distinct beams of light of different colors (e.g., from each of drivers 202A, 202B, and 202C) to be spatially offset at each of mirrors 224 and 226 and thus during scanning across the displayed far-field image (e.g., with an angular separation between beams of 1-10 mRad relative to the tangential axis dimension). This may fill out more of the image with light relative to scenarios where only a single laser is used, thereby maximizing the resolution of the displayed far-field image. The relatively fine pitch 238 of channels 218 at edge 210 of PIC 200 further maximizes the resolution of the displayed far-field (e.g., to at least 1920×1080). Scanning mirrors 224 and 226 may rotate rapidly enough to support relatively high frame rates (e.g., 90 Hz or greater).

Concurrently scanning different beams of light (e.g., from each driver 202) may also allow scanning mirror 224 to rotate more slowly while covering the sagittal axis than in scenarios where only a single beam is swept (e.g., because each beam will fill in some of the displayed far-field image that would otherwise have to be covered using additional cycles of a single beam). For example, scanning mirror 224 may rotate at 20 kHz or lower whereas the scanning mirror would need to rotate at 20 kHz or higher in scenarios where only a single beam is scanned. This reduction in rotational frequency for scanning mirror 224 may reduce mechanical deformations in mirror 224 during rotation, thereby minimizing beam divergence and maximizing image resolution in the far-field. Mirror 224 may also be up to 40% larger than the 27 kHz scanning mirror (e.g., without introducing excessive rotational deformation), further allowing mirror 224 to maximize far-field image resolution. Mirror 226 may rotate at any desired frequency that is less than the rotational frequency of mirror 224.

The example of FIG. 12 is merely illustrative. In general, two driver circuits 202 or more than three driver circuits 202 may be used. Each driver circuit 202 may drive any desired number of laser dies. If desired, drivers 202, laser dies 204, optics 206, and/or PIC 200 may be mounted to a common substrate to form a single integrated optical system, package, or integrated circuit 240.

Figure 13:
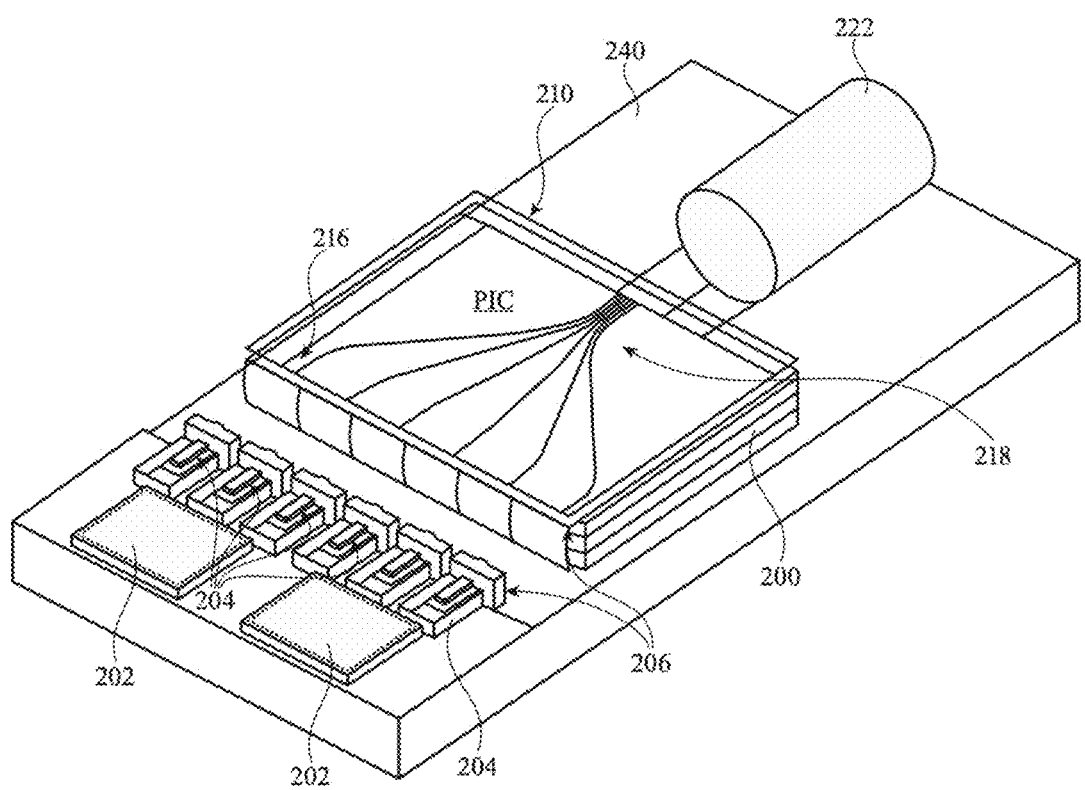
FIG. 13 is a perspective view of illustrative light sources for optical system components of the type shown in FIG. 12 in accordance with an embodiment.

FIG. 13 is a perspective view showing how lenses 206 may couple light from laser dies 204 into PIC 200. As shown in FIG. 13, laser dies 204 may include edge-emitting laser dies that emit light. Coupling lenses 206 may include one or more ball lenses, one or more confocal lenses, a single lens, a microlens mounted to laser die 204, or directly on edge 216 of PIC 200, and/or other optical components to direct light from laser dies 204 onto or to otherwise couple the light into channels 218 in PIC 200. Optical components 206 may be omitted and laser dies 204 may emit light directly into channels 218 if desired.

Figure 14:
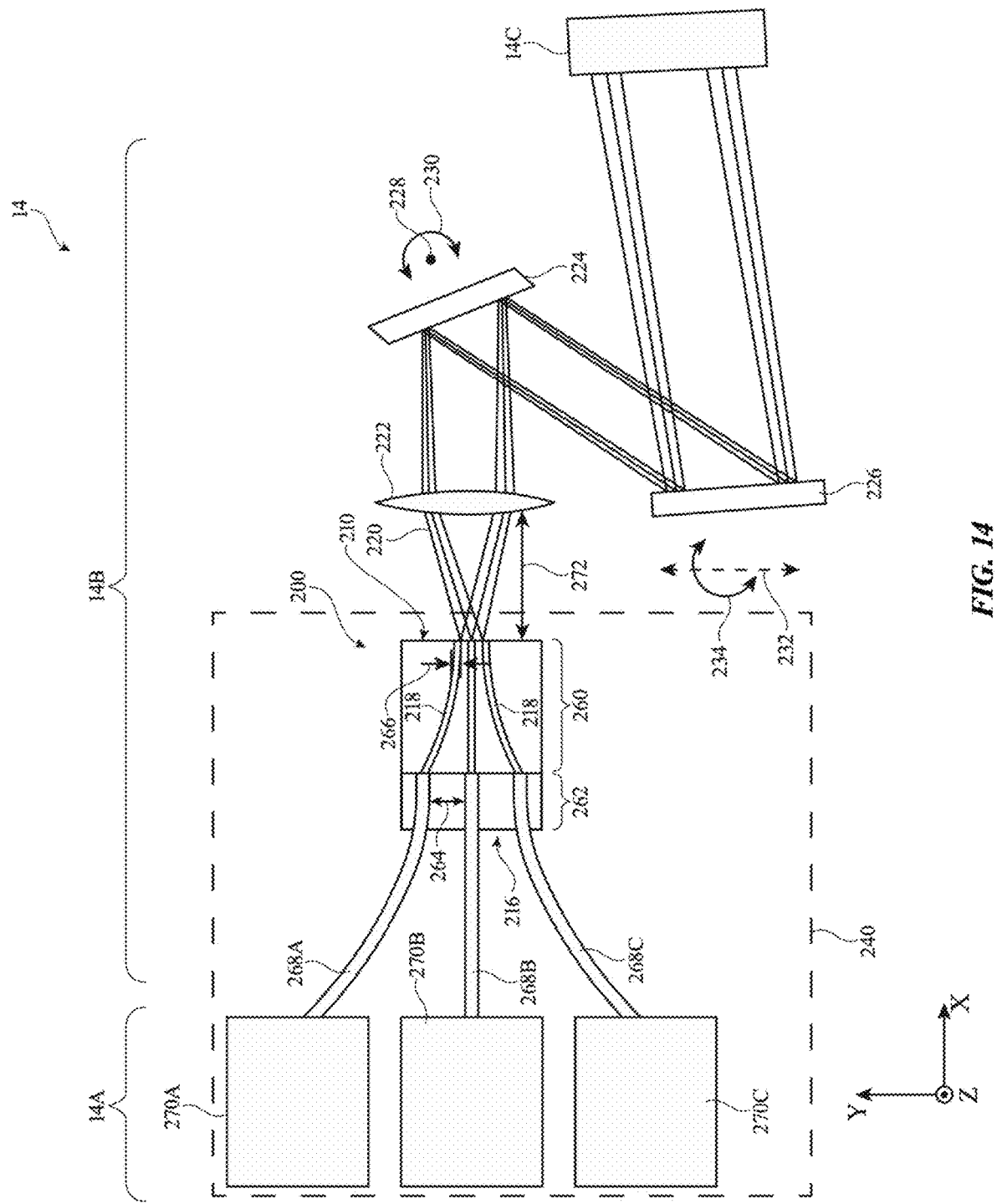
FIG. 14 is a top-down view of illustrative optical system components that include two independent scanning mirrors and a photonic integrated circuit coupled to light sources over optical fibers for providing image light to a user in accordance with an embodiment.

If desired, the laser dies in display system 14 may be coupled to PIC 200 over optical fibers. FIG. 14 is a top-down view showing how the laser dies in display system 14 may be coupled to PIC 200 over optical fibers. As shown in FIG. 14, light sources 14A may include RGB laser dies 270A, 270B, and 270C that each emit laser light of a corresponding color. RGB laser die 270A may be coupled to PIC 200 over optical fiber 268A, RGB laser die 270B may be coupled to PIC 200 over optical fiber 268B, and RGB laser die 270C may be coupled to PIC 200 over optical fiber 268C. Optical fibers 268A, 268B, and 268C may be coupled to groove array 262 on PIC 200. Groove array 262 may include grooves that hold the optical fibers in place at fixed pitch 264. Pitch 264 is relatively large due to the physical size of the optical fibers. PIC die 200 may include a pitch reduction region 260 that includes corresponding channels 218 coupled to each optical fiber in groove array 262. Channels 218 may exhibit pitch 264 at the boundary between regions 262 and 260 and may exhibit a reduced pitch 266 at edge 210 of PIC 200 (e.g., between 10 microns and 20 microns, approximately 12 microns, between 8 microns and 16 microns, less than 8 microns, greater than 20 microns, between 5 and 20 microns, etc.). Channels 218 may subsequently emit separate beams of light from RGB laser dies 270A, 270B, and 270C towards collimator 222. Mirrors 224 and 226 may perform tangential and sagittal axis scanning to fill in the two-dimensional far field image frame with the beams of light emitted by laser dies 270A, 270B, and 270C.

The example of FIG. 14 is merely illustrative. In general, any desired number of laser dies 270 may be used (e.g., three or more laser dies 270 or four or more laser dies 270 that emit light of any desired visible, ultraviolet, or infrared wavelengths). Laser dies 270, optical fibers 268, and PIC 200 may be mounted to a common substrate to form a single integrated optical system, package, or integrated circuit 240 if desired.

The example of FIGS. 12-14 is merely illustrative. In general, light of any desired wavelengths may be transmitted by PIC 200. If desired, wavelength multiplexing may be used in which different holographic elements in other optical components 14C perform different operations on different wavelengths of red light, different wavelengths of green light, and different wavelengths of blue light, for example. PIC 200 may transmit ultraviolet light and/or infrared light if desired. PIC 200 may also provide reflected infrared light to photodiodes coupled to PIC 200 (e.g., to perform gaze tracking and/or depth sensing operations). Laser dies 204 and 270 need not include edge-emitting laser dies and may, if desired, include VCSELs or may be formed using any other desired light emitting elements (e.g., LEDs). Drivers 202 may be coupled to dies 204 (FIG. 12) using wire bonding, through silicon vias, ceramics or silicon interposers, or any other desired interconnect structures. Substrate 208 of PIC 200 may include glass, oxynitride, nitride, or any other desired materials, may be formed in a single layer, or may include multiple layers of material. PIC 200 may serve to reduce the relatively large pitch associated with light sources 204 and 270 to maximize the resolution of the displayed far-field image despite the use of physically large light sources. While FIGS. 12 and 14 illustrate two mirrors 224 and 226 as separate discrete mirrors (e.g., for performing respective fast and slow axis scanning), this is merely illustrative and in another suitable arrangement, mirrors 224 and 226 may be implemented as a single mirror that is scanned over two degrees of freedom (e.g., the fast (sagittal) and slow (tangential) axes, where each degree of freedom is scanned at the same frequency as a respective one of mirrors 224 and 226 would be scanned in a scenario where two discrete mirrors are used).

Figure 15:
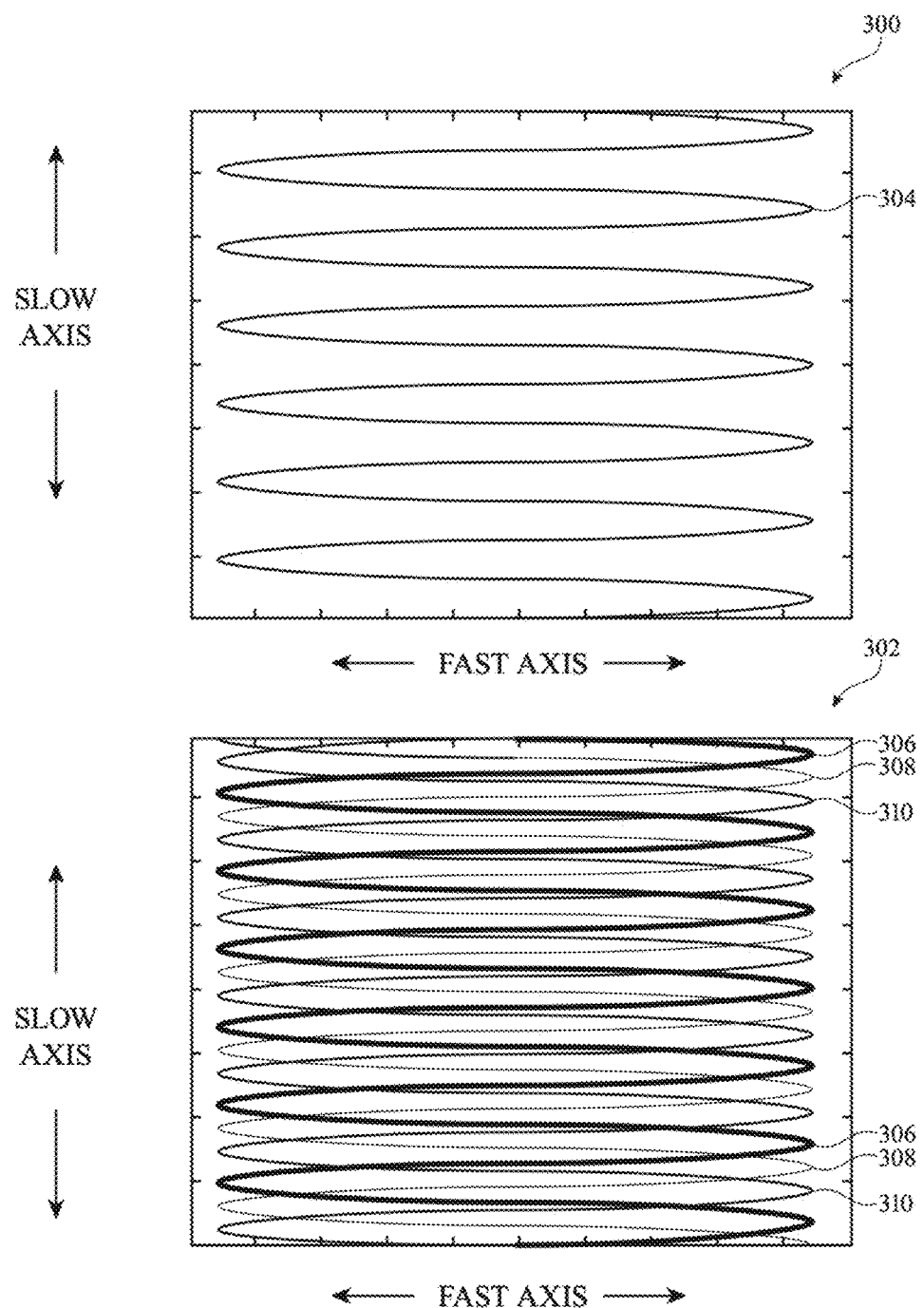
FIG. 15 is a graph showing how image light may be scanned to fill a field of view using illustrative optical system components of the type shown in FIGS. 12-14 in accordance with an embodiment.

FIG. 15 illustrates plots showing how mirrors 224 and 226 (or a single mirror in scenarios where the mirror is scanned over two degrees of freedom) may perform fast and slow scanning to fill a high resolution image frame in the far-field (optical domain). As shown in FIG. 15, graph 300 plots the scanning of an optical system that includes only a single RGB light source. Curve 304 of graph 300 illustrates how the beam of light is swept across the two-dimensional image frame in this scenario. As shown by curve 304, there is a relatively large amount of empty (blank) space between each cycle of the beam. This serves to limit the overall resolution of the displayed image.

Graph 302 of FIG. 15 plots the scanning of optical system 14B of FIGS. 12-14. Curve 306 plots the beam produced by driver 202A of FIG. 12 or die 270A of FIG. 14 (e.g., a beam of light of a first color). Curve 308 plots the beam produced by driver 202B of FIG. 12 or die 270B of FIG. 14 (e.g., a beam of light of a second color). Curve 310 plots the beam produced by driver 202C of FIG. 12 or die 270C of FIG. 14 (e.g., a beam of light of a second color). Sweeping along the fast (sagittal) axis of graph 302 is performed by scanning mirror 224 whereas sweeping along the slow (tangential) axis of graph 302 is performed by scanning mirror 226. The pitch reduction provided by PIC 200 creates a very fine angular separation between each beam (e.g., between 1-10 mRad relative to the tangential axis). This allows beams 306, 308, and 310 to fill in what would otherwise be empty (blank) space between a single beam (e.g., as shown by curve 304 of graph 300). This in turn minimizes the required scanning speed for mirror 224 (e.g., to 20 kHz or lower), allowing for the diameter of mirror 224 to be maximized without incurring rotation-related deformation, and maximizes the resolution of the displayed two-dimensional far-field image. If desired, mirror 224 may scan at a speed higher than 20 kHz (e.g., so that the mirror scans outside of the audible range of the human ear).

If desired, the light in channels 218 of FIGS. 12-14 may be combined (coupled) between channels 218 using an optical combiner in PIC 200. For example, light of a first color may propagate through channel 218, light of a second color may propagate through a second channel 218, and light of a third color may propagate through a second channel 218 of PIC 200. A light combiner may include one or more optical couplers. The optical couplers may include portions of channels 218 that are brought into close proximity to each other so that light of different colors leaks between the channels. These types of optical couplers may be used to provide any mixture of light of different colors to a given channel for output from the PIC. In this way, light of any desired colors may be emitted by any given channel 218 at edge 210 of PIC 200.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system (e.g., an electronic system including the display systems described herein). In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The display systems described herein may be used for these types of systems and for any other desired display arrangements.

As described above, one aspect of the present technology is the gathering and use of data available from various sources to improve the delivery of images to users, perform gaze tracking operations, and/or to perform other display-related operations. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to track a user's gaze to update displayed images and/or to perform other desired display operations. Accordingly, use of such personal information data enables users to view updated display images. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of gaze tracking, the present technology can be configured to allow users to select to "opt in" or "opt out" of participation in the collection of personal information data during registration for services or anytime thereafter. In another example, users can select not to perform gaze tracking or other operations that gather personal information data. In yet another example, users can select to limit the length of time gaze tracking is performed. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, display images based on non-personal information data or a bare minimum amount of personal information, such as the content being requested by the device associated with a user, other non-personal information available to the display system, or publicly available information.

The foregoing is merely illustrative and various modifications can be made to the described embodiments. The foregoing embodiments may be implemented individually or in any combination.

What is claimed is:

1. A display system configured to display an image frame, the display system comprising:
    first, second, and third sets of laser dies, wherein the first set of laser dies is configured to emit a first set of beams of light, the second set of laser dies is configured to emit a second set of beams of light, and the third set of laser dies is configured to emit a third set of beams of light, wherein the first, second, and third sets of beams each include light in at least three wavelength ranges;
    a photonic integrated circuit, wherein the first, second, and third sets of laser dies are configured to respectively emit the first, second, and third sets of beams into the photonic integrated circuit with a first non-zero pitch, and wherein the photonic integrated circuit is configured to emit the first, second, and third set of beams with a second non-zero pitch that is finer than the first non-zero pitch;
    a first scanning mirror configured to reflect the first, second, and third sets of beams while scanning along a first axis of the image frame; and
    a second scanning mirror configured to reflect the first, second, and third sets of beams while scanning along a second axis of the image frame.

2. The display system defined in claim 1, wherein the first axis comprises a sagittal axis and the first scanning mirror is configured to scan along the sagittal axis at a first frequency.

3. The display system defined in claim 2, wherein the second axis comprises a tangential axis and the second scanning mirror is configured to scan along the tangential axis at a second frequency that is less than the first frequency.

4. The display system defined in claim 3, wherein the first frequency is greater than 20 kHz.

5. The display system defined in claim 3, further comprising output collimating optics interposed between the photonic integrated circuit and the first scanning mirror that are configured to collimate the first, second, and third sets of beams and to direct the first, second, and third sets of beams at the first scanning mirror, the first scanning mirror being configured to then reflect the first, second, and third sets of beams towards the second scanning mirror.

6. The display system defined in claim 3, wherein the at least three wavelength ranges comprise first, second, and third visible colors.

7. The display system defined in claim 1, wherein the photonic integrated circuit comprises a substrate having a first index of refraction and a plurality of channels in the substrate having a second index of refraction that is different from the first index of refraction, the plurality of channels being configured to convey the first, second, and third sets of beams and to transmit the first, second, and third beams sets of beams out of the photonic integrated circuit.

8. The display system defined in claim 1 wherein, upon emission by the photonic integrated circuit:
    the first set of beams is spatially offset with respect to the second set of beams, and
    the third set of beams is spatially offset with respect to the first set of beams and with respect to the second sets of beams.

9. The display system defined in claim 1, further comprising:
    coupling lenses configured to couple the first, second, and third sets of beams into the photonic integrated circuit.

10. The display system defined in claim 1, further comprising:

a first laser driver coupled to each laser die in the first set of laser dies;
a second laser driver coupled to each laser die in the second set of laser dies; and
a third laser driver coupled to each laser die in the third set of laser dies.

11. The display system defined in claim 10, wherein the first, second, and third sets of laser dies each comprise edge-emitting laser dies.

12. The display system defined in claim 1, further comprising:
a first set of optical fibers that couples the first set of laser dies to the photonic integrated circuit;
a second set of optical fibers that couples the second set of laser dies to the photonic integrated circuit; and
a third set of optical fibers that couples the third set of laser dies to the photonic integrated circuit.

13. The display system defined in claim 12, wherein the photonic integrated circuit comprises a groove array that holds the first, second, and third sets of optical fibers in place.

14. Apparatus comprising:
a first set of light sources configured to emit a first set of beams in at least three wavelength ranges;
a second set of light sources configured to emit a second set of beams in at least three wavelength ranges;
a photonic integrated circuit having opposing first and second edges and having a lateral surface that extends from the first edge to the second edge, the photonic integrated circuit comprising:
a first set of channels configured to receive the first set of beams through the first edge of the photonic integrated circuit and configured to transmit the first set of beams out of the second edge of the photonic integrated circuit, and
a second set of channels configured to convey the second set of beams and configured to transmit the second set of beams out of the second edge of the photonic integrated circuit;
a sagittal axis scanning mirror configured to reflect the first and second sets of beams; and
a tangential axis scanning mirror configured to reflect the first and second sets of beams reflected by the sagittal axis scanning mirror.

15. The apparatus defined in claim 14, wherein the first set of beams are separated from each other and the second set of beams are separated from each other upon transmission from the photonic integrated circuit by a corresponding angular separation and wherein the angular separation is between 1 mRAD and 10 mRAD.

16. The apparatus defined in claim 14, wherein each channel in the first set of channels is separate from each other channel in the first set of channels and wherein each channel in the second set of channels is separate from each other channel in the first and second sets of channels.

17. The apparatus defined in claim 14, wherein the photonic integrated circuit has opposing third and fourth edges, the lateral surface extends from the third edge to the fourth edge, and the second set of channels is configured to receive the second set of beams through the third edge of the photonic integrated circuit.

18. The apparatus defined in claim 14, wherein the first and second sets of light sources comprise a light source selected from the group consisting of: an edge-emitting laser die, a vertical cavity surface emitting laser (VCSEL), a resonant cavity light emitting diode (RCLED), and a light emitting diode (LED).

19. The apparatus defined in claim 14, further comprising:
a third set of light sources configured to emit a third set of beams in at least three wavelength ranges;
a third set of channels in the photonic integrated circuit configured to convey the third set of beams and to transmit the third set of beams out of the second edge of the photonic integrated circuit; and
a light coupler configured to couple at least some of the third set of beams into the second set of channels.

20. The apparatus defined in claim 14, wherein the at least three wavelength ranges comprise at least one visible wavelength range.

21. The apparatus defined in claim 20, wherein the at least three wavelength ranges comprise at least one infrared wavelength range.

22. The apparatus defined in claim 14, wherein the photonic integrated circuit has opposing third and fourth edges, the lateral surface extends from the third edge to the fourth edge, and the second set of channels is configured to receive the second set of beams through the first edge of the photonic integrated circuit.

23. The apparatus defined in claim 22, wherein the photonic integrated circuit has an additional lateral surface opposite the lateral surface, the apparatus further comprising:
a substrate, wherein the additional lateral surface of the photonic integrated circuit is mounted to a surface of the substrate;
coupling lenses mounted to the surface of the substrate and configured to direct the first and second sets of beams towards the first edge of the photonic integrated circuit;
a first driver mounted to the surface of the substrate and configured to drive the first set of light sources; and
a second driver mounted to the surface of the substrate and configured to drive the second set of light sources, wherein the first, second, third, and fourth edges of the photonic integrated circuit extend perpendicular to the surface of the substrate, the lateral surface of the photonic integrated circuit, and the additional lateral surface of the photonic integrated circuit.

24. Apparatus comprising:
a first set of laser dies driven by a first laser driver and configured to emit a first set of beams in at least three wavelength ranges;
a second set of laser dies driven by a second laser driver and configured to emit a second set of beams in at least three wavelength ranges; and
a photonic integrated circuit (PIC) having first, second, third, and fourth edges, a lateral surface extending between the first, second, third, and fourth edges, and comprising a first set of channels and a second set of channels, wherein:
the first edge opposes the second edge,
the third edge opposes the fourth edge,
each channel in the first set of channels extends from the first edge of the PIC to the second edge of the PIC and is separate from each other channel in the first set of channels,
each channel in the second set of channels extends from the third edge of the PIC to the second edge of the PIC and is separate from each other channel in the first and second sets of channels,
each channel in the first set of channels is configured to receive, through the first edge of the PIC, a respective beam of the first set of beams emitted by the first set of laser dies, each channel in the second set of channels is configured to receive, through the third edge of the PIC, a respective beam of the second set of beams emitted by the second set of laser dies,
the first set of channels has a first pitch at the first edge,
the second set of channels has the first pitch at the third edge, and
the first and second sets of channels have a second pitch at the second edge of the PIC that is less than the first pitch.

* * * * *